United States Patent
Sumi

Patent Number: 5,087,972
Date of Patent: Feb. 11, 1992

[54] METHOD OF AND APPARATUS FOR PROCESSING IMAGE SIGNALS AT A POINT OF INTEREST BASED ON IMAGE SIGNAL CURVATURE

[75] Inventor: Katsuto Sumi, Kanagawa, Japan

[73] Assignee: Fuji Photo Film Co., Ltd., Kanagawa, Japan

[21] Appl. No.: 510,902

[22] Filed: Apr. 17, 1990

[30] Foreign Application Priority Data

Apr. 18, 1989 [JP] Japan .................................. 1-098147

[51] Int. Cl.$^5$ .............................................. H04N 5/14
[52] U.S. Cl. .................................. 358/166; 358/447; 382/22; 382/54; 328/114; 307/517
[58] Field of Search ............................ 382/6, 29, 54, 22; 358/445, 447, 463, 166; 328/114, 132; 307/236, 517

[56] References Cited

U.S. PATENT DOCUMENTS

| | | | |
|---|---|---|---|
| 3,832,577 | 8/1974 | Harr | 307/351 |
| 4,081,836 | 8/1978 | Skihner | 358/166 |
| 4,319,268 | 3/1982 | Yamada | 358/75 |
| 4,335,407 | 6/1982 | Atoji et al. | 358/447 |
| 4,670,793 | 6/1987 | Yamada et al. | 358/463 |

FOREIGN PATENT DOCUMENTS

| | | |
|---|---|---|
| 2421389 | 1/1975 | Fed. Rep. of Germany . |
| 3016978 | 1/1985 | Fed. Rep. of Germany . |
| 3024126 | 7/1987 | Fed. Rep. of Germany . |
| 3524852 | 3/1988 | Fed. Rep. of Germany . |
| 2165717 | 4/1986 | United Kingdom . |

*Primary Examiner*—Leo H. Boudreau
*Assistant Examiner*—Barry Stellrecht
*Attorney, Agent, or Firm*—Sughrue, Mion, Zinn, Macpeak & Seas

[57] ABSTRACT

An image signal ($S_{ij}$) from an original which gears image information is processed by generating a new image signal ($S'_{ij}$) from the image signal ($S_{ij}$). It is first determined whether the configuration of the distribution of the image signal ($S_{ij}$) at a point of interest (i, j) is upwardly convex, or a downwardly convex, or otherwise. An image emphasis signal ($S_{Gij}$) larger than the image signal ($S_{ij}$) at the point of interest (i, j) is employed as the new image signal ($S'_{ij}$) if the configuration is upwardly convex. An image emphasis signal ($S_{Lij}$) smaller than the image signal ($S_{ij}$) at the point of interest (i, j) is employed as the new image signal ($S'_{ij}$) if the configuration is downwardly convex. The original image signal ($S_{ij}$) or an unsharp signal ($U_{ij}$), generated from the new image signal ($S'_{ij}$), is employed as the new image signal ($S'_{ij}$) if the configuration is otherwise.

38 Claims, 23 Drawing Sheets

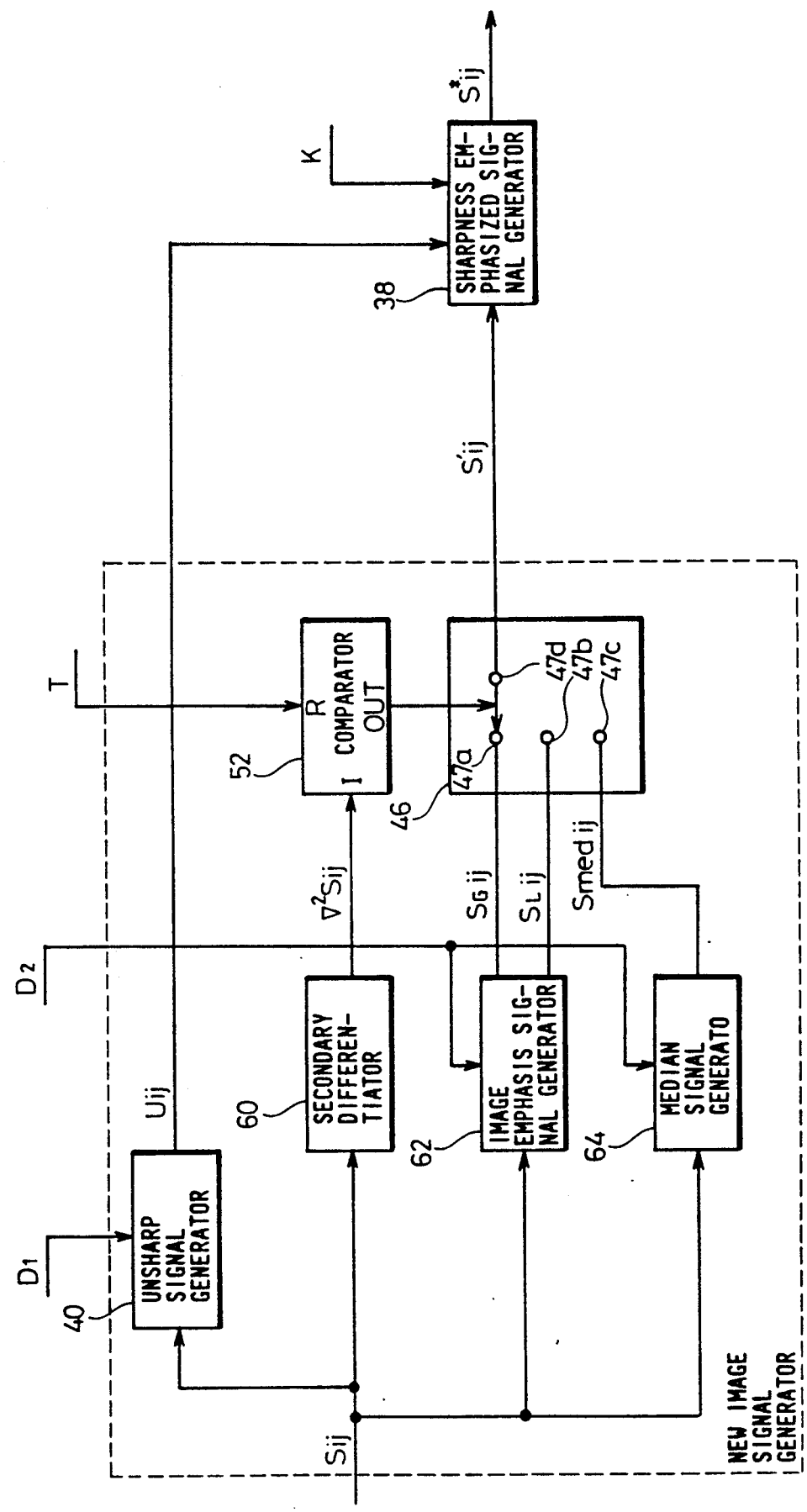

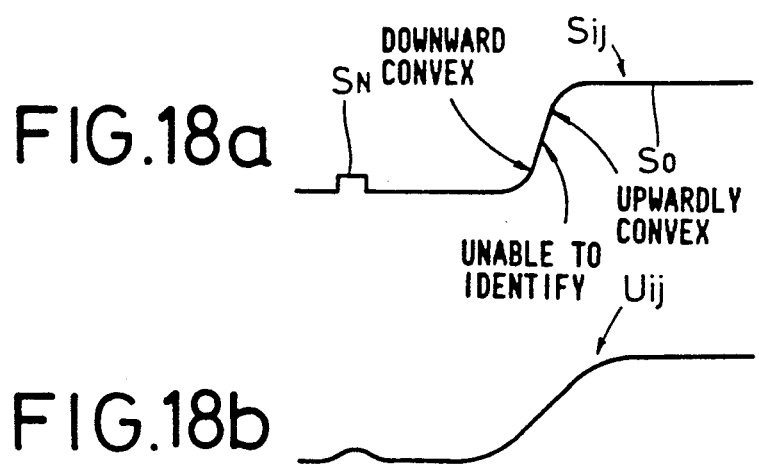
FIG.18a
FIG.18b
FIG.18c
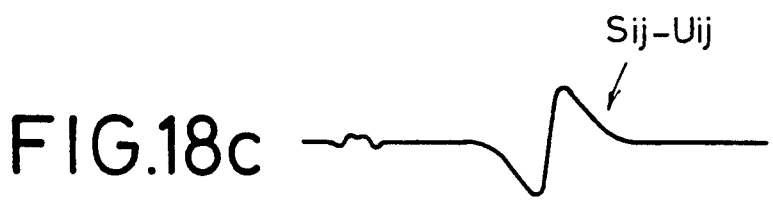
FIG.18d
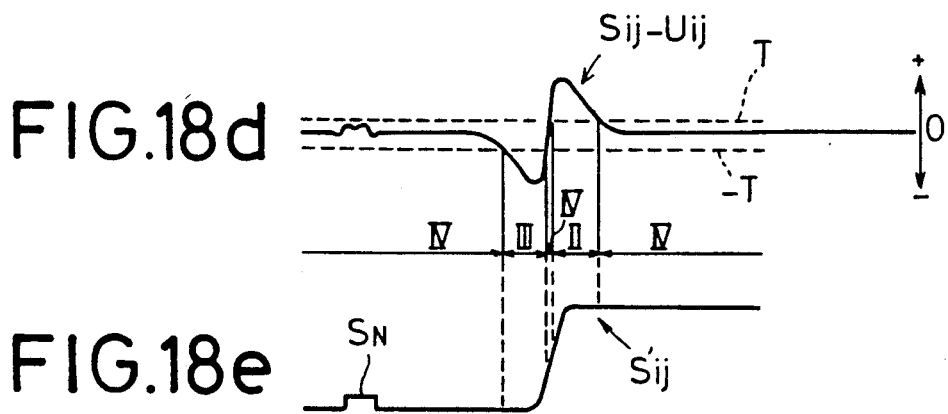
FIG.18e
FIG.18f
FIG.18g
FIG.18h
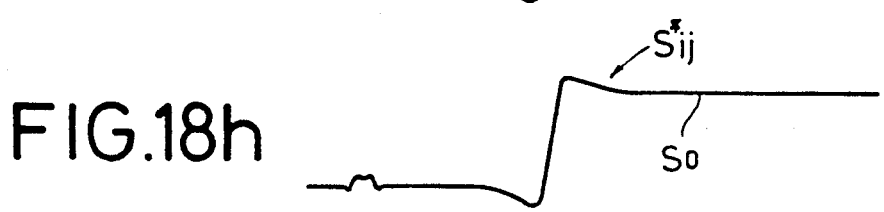

METHOD OF AND APPARATUS FOR PROCESSING IMAGE SIGNALS AT A POINT OF INTEREST BASED ON IMAGE SIGNAL CURVATURE

BACKGROUND OF THE INVENTION

The present invention relates to a method of and an apparatus for processing an image signal, and more particularly to a method of and an apparatus for processing an image signal for effective sharpness emphasis in an image scanning processing apparatus such as platemaking scanners, facsimile machines, or the like.

Image scanning reading and reproducing systems are widely used in the printing and platemaking industries for electrically processing image information of originals or subjects to produce original film plates with a view to simplifying the entire process and improving the quality of printed images.

The image scanning reading and reproducing systems are basically constructed of an image reading apparatus and an image recording apparatus. In the image reading apparatus, image information of an original or subject which is fed in an auxiliary scanning direction is scanned by a photosensor in a main scanning direction substantially normal to the auxiliary scanning direction, and the scanned image information is converted to an electric signal. Then, the photoelectrically converted image information is processed according to platemaking conditions. Thereafter, the processed image signal is converted to a light signal such as a laser beam signal which is applied to and recorded on an image recording medium of a photosensitive material such as a photographic film in the image recording apparatus. The image recording medium with the image recorded thereon is developed by an image developing device and will be used as a film plate for printing.

If the image on an original is a halftone image such as a photographic image, the image scanning reading and reproducing system effects a sharpness emphasizing process on the image by sharpening the profile of the image for making the image easier to see. The sharpness emphasis is carried out as shown in FIG. 1 of the accompanying drawings, for example. Before an image signal S is processed for sharpness emphasis, (n×n) image signals are extracted from around the image signal S, and averaged to generate a local average signal U. Then, a signal S−U indicative of the difference between the image signal S and the local average signal U is determined, and then multiplied by a coefficient signal K. The product is added to the image signal S. As a result, an image signal S* which has been processed for sharpness emphasis (hereinafter referred to as a "sharpness emphasized signal") is obtained as defined by:

$$S^* = S + K \cdot (S - U) \tag{1}$$

A halftone image such as a photographic image is further processed so as to produce a halftone dot image after it has been processed for sharpness emphasis. More specifically, the sharpness emphasized signal S* is converted to a binary signal based on a given halftone dot signal, and a halftone dot image which has been processed for sharpness emphasis is produced on an image recording medium by the binary signal.

The original which bears the image may have a defect produced when the original was formed, a mark or trace of the edge of a photoprint glued thereto, or a deposit of dust or dirt. If the original suffers such a defective condition, then an image signal read by the photosensor is made of up of a mixture of a signal component $S_O$ having a larger amplitude and a noise component $S_N$ having a smaller amplitude which is caused by the defective condition, as shown in FIG. 2(a). Consequently, as shown in FIGS. 2(b) and 2(c), the local mean signal U and the differential signal S−U also contain signal components resulting from the noise component $S_N$. As a result, as shown inferential signal S−U also contain signal components resulting from the noise component $S_N$. As a result, as shown inferential signal S−U also contain signal components resulting from the noise component $S_N$. As a result, as shown in FIG. 2(d), the sharpness emphasized signal S* contains a noise component $S^*_N$ which has also been processed for sharpness emphasis, as well as a sharpness emphasized signal $S^*_O$ resulting from the signal component $S_O$. When a halftone dot image is formed on an image recording medium based on the sharpness emphasized signal S* which contains the noise component $S^*_N$, an image based on the sharpness emphasized signal $S^*_O$ and an image based on the sharpness emphasized noise component $S^*_N$ are simultaneously reproduced. The entire combined image thus reproduced is of low quality as the noise component $S_N$ is emphasized. Therefore, the conventional process of emphasizing image sharpness is limited in its applications.

SUMMARY OF THE INVENTION

It is a general object of the present invention to provide a method of and an apparatus for processing an image signal from the image on an original or subject such that an image signal (hereinafter referred to as a "new image signal") with emphasis on a characteristic portion of the original image signal is generated from the original image signal, and the new image signal is processed for sharpness emphasis, for thereby emphasizing only a signal component without emphasizing a noise component.

Another object of the present invention is to provide a method of processing an image signal by generating a new image signal (S'ij) from an image signal (Sij), comprising the steps of determining whether the configuration of the distribution of the image signal (Sij) at a point of interest (i, j) is upwardly convex, or a downwardly convex, or otherwise, employing, as the new image signal (S'ij), an image emphasis signal (SGij) larger than the image signal (Sij) at the point of interest (i, j), if the configuration is upwardly convex, employing, as the new image signal (S'ij), an image emphasis signal (SLij) smaller than the image signal (Sij) at the point of interest (i, j), if the configuration is downwardly convex, and employing, as the new image signal (S'ij), the original image signal (Sij) or an unsharp signal (Uij) if the configuration is otherwise.

Still another object of the present invention is to provide the method wherein the image emphasis signals (SGij), (SLij) are maximum and minimum signals (Smaxij), (Sminij) out of image signals in a region near the point of interest (i, j) of the image signal (Sij).

Still another object of the present invention is to provide the method wherein the image emphasis signals (SGij), (SLij) are produced from maximum and minimum signals (Smaxij), (Sminij) out of image signals in a region near the point of interest (i, j) of the image signal (Sij) and constants t, t' (0<t<1, 0<t'<1) according to the equations:

$$S_{Gij} = (1-t) \cdot Sij + t \cdot Smaxij$$

$$S_{Lij} = (1-t') \cdot Sij + t' \cdot Sminij.$$

Yet another object of the present invention is to provide the method further comprising the step of comparing a differential signal (Sij−Uij) produced by subtract the unsharp signal (Uij) from the image signal (Sij) with a threshold signal (T) to determine whether the configuration of the distribution of the image signal (Sij) is upwardly convex, or a downwardly convex, or otherwise.

Yet still another object of the present invention is to provide the method further comprising the step of comparing a Laplacian signal ($\nabla^2$Sij) produced from the image signal (Sij) with a threshold signal (T) to determine whether the configuration of the distribution of the image signal (Sij) is upwardly convex, or a downwardly convex, or otherwise.

A further object of the present invention is to provide the method wherein the unsharp signal (Uij) comprises an average signal (Uaveij) or a median signal (Umedij) in a region near the point of interest (i, j).

A further object of the present invention is to provide the method further comprising the step of generating a sharpness emphasized signal (S*ij) from the new image signal (S'ij) and the unsharp signal (Uij) according to the equation:

$$S^*ij = S'ij + K \cdot (S'ij - Uij)$$

where K is a coefficient signal.

A yet further object of the present invention is to provide the method further comprising the steps of generating an unsharp signal (U'ij) from the new image signal (S'ij), and thereafter generating a sharpness emphasized signal (S*ij) from the new image signal (S'ij) and the unsharp signal (U'ij) according to the equation:

$$S^*ij = S'ij + K \cdot (S'ij - U'ij)$$

where K is a coefficient signal.

A yet still further object of the present invention is to provide the method wherein the coefficient signal K and the differential signal (S'ij−Uij) are replaced respectively with a function signal (K(S'ij)) with the image signal (S'ij) as a variable and a function signal (F(S'ij−Uij)) with the differential signal (S'ij−Uij) as a variable, and the sharpness emphasized signal (S*ij) is generated according to the equation:

$$S^*ij = S'ij + K(S'ij) \cdot F(S'ij - Uij).$$

Another object of the present invention is to provide the method wherein the coefficient signal K and the differential signal (S'ij−U'ij) are replaced respectively with a function signal (K(S'ij)) with the image signal (S'ij) as a variable and a function signal (F(S'ij−U'ij)) with the differential signal (S'ij−U'ij) as a variable, and the sharpness emphasized signal (S*ij) is generated according to the equation:

$$S^*ij = S'ij + K(S'ij) \cdot F(S'ij - U'ij).$$

Another object of the present invention is to provide the method further comprising the step of generating a sharpness emphasized signal (S*ij) from the original image signal (Sij), the new image signal (S'ij), and the unsharp signal (Uij) according to the equation:

$$S^*ij = Sij + K \cdot (S'ij - Uij)$$

where K is a coefficient signal.

Still another object of the present invention is to provide the method further comprising the step of generating a sharpness emphasized signal (S*ij) from the original image signal (Sij), the new image signal (S'ij), and an unsharp signal (U'ij) produced from the new image signal (S'ij), according to the equation:

$$S^*ij = Sij + K \cdot (S'ij - U'ij)$$

where K is a coefficient signal.

Still another object of the present invention is to provide the method wherein the coefficient signal K and the differential signal (S'ij−Uij) are replaced respectively with a function signal (K(Sij)) with the original image signal (Sij) as a variable and a function signal (F(S'ij−Uij)) with the differential signal (S'ij−Uij) as a variable, and the sharpness emphasized signal (S*ij) is generated according to the equation:

$$S^*ij = Sij + K(Sij) \cdot F(S'ij - Uij).$$

Yet another object of the present invention is to provide the method wherein the coefficient signal K and the differential signal (S'ij−U'ij) are replaced respectively with a function signal (K(Sij)) with the original image signal (Sij) as a variable and a function signal (F(S'ij−U'ij)) with the differential signal (S'ij−U'ij) as a variable, and the sharpness emphasized signal (S*ij) is generated according to the equation:

$$S^*ij = Sij + K(Sij) \cdot F(S'ij - U'ij).$$

It is also an object of the present invention to provide an apparatus for processing an image signal, comprising comparing means (52) for determining whether the configuration of the distribution of the image signal (Sij) at a point of interest (i, j) is upwardly convex, or a downwardly convex, or otherwise, image emphasis signal generating means (62) for generating an image emphasis signal (S$_G$ij) larger than the image signal (Sij) at the point of interest (i, j) or an image emphasis signal (S$_L$ij) smaller than the image signal (Sij) at the point of interest (i, j), and new signal selecting means (46) for selecting the image emphasis signal (S$_G$ij) if the configuration is upwardly convex, the image emphasis signal (S$_L$ij) if the configuration is downwardly convex, and the image signal (Sij) if the configuration is otherwise.

Another object of the present invention is to provide the apparatus wherein the image emphasis signals (S$_G$ij), (S$_L$ij) are maximum and minimum signals (Smaxij), (Sminij) out of image signals in a region near the point of interest (i, j) of the image signal (Sij).

Still another object of the present invention is to provide the apparatus wherein the image emphasis signals (S$_G$ij), (S$_L$ij) produced from maximum and minimum signals (Smaxij), (Sminij) out of image signals in a region near the point of interest (i, j) of the image signal (Sij) and constants t, t' (0<t<1, 0<t'<1) according to the equations:

$$S_{Gij} = (1-t) \cdot Sij + t \cdot Smaxij$$

$$S_Lij=(1-t')\cdot Sij+t'\cdot Sminij.$$

Still another object of the present invention is to provide the apparatus further comprising secondary differentiating means (60) for generating a Laplacian signal ($\nabla^2$Sij) from the image signal (Sij), the comparing means (52) comprising means for comparing the Laplacian signal ($\nabla^2$Sij) with a threshold signal (T) to determine whether the configuration of the distribution of the image signal (Sij) is upwardly convex, or a downwardly convex, or otherwise.

A further object of the present invention is to provide an apparatus for processing an image signal, comprising comparing means (52) for determining whether the configuration of the distribution of the image signal (Sij) at a point of interest (i, j) is upwardly convex, or a downwardly convex, or otherwise, image emphasis signal generating means (62) for generating an image emphasis signal (S_Gij) larger than the image signal (Sij) at the point of interest (i, j) or an image emphasis signal (S_Lij) smaller than the image signal (Sij) at the point of interest (i, j), unsharp signal generating means (40) for generating an unsharp signal (Uij) from the image signal (Sij), and new signal selecting means (46) for selecting the image emphasis signal (S_Gij) if the configuration is upwardly convex, image emphasis signal (S_Lij) if the configuration is downwardly convex, and the image signal (Sij) or the unsharp signal (Uij) if the configuration is otherwise.

Still another object of the present invention is to provide the apparatus wherein the image emphasis signals (S_Gij), (S_Lij) are maximum and minimum signals (Smaxij), (Sminij) out of image signals in a region near the point of interest (i, j) of the image signal (Sij).

Yet another object of the present invention is to provide the apparatus wherein the image emphasis signals (S_Gij), (S_Lij) are produced from maximum and minimum signals (Smaxij), (Sminij) out of image signals in a region near the point of interest (i, j) of the image signal (Sij) and constants t, t'($0<t<1$, $0<t'<1$) according to the equations:

$$S_Gij=(1-t)\cdot Sij+t\cdot Smaxij$$

$$S_Lij=(1-t')\cdot Sij+t'\cdot Sminij.$$

Yet still another object of the present invention is to provide the apparatus further comprising subtracting means (42) for subtracting the unsharp signal (Uij) from the image signal (Sij) to produce a differential signal (Sij−Uij), the comparing means (52) comprising means for comparing the differential signal (Sij−Uij) with a threshold signal (T) to determine whether the configuration of the distribution of the image signal (Sij) is upwardly convex, or a downwardly convex, or otherwise.

A further object of the present invention is to provide the apparatus further comprising secondary differentiating means (60) for generating a Laplacian signal ($\nabla^2$Sij) from the image signal (Sij), the comparing means (52) comprising means for comparing the Laplacian signal ($\nabla^2$Sij) with a threshold signal (T) to determine whether the configuration of the distribution of the image signal (Sij) is upwardly convex, or a downwardly convex, or otherwise.

A still further object of the present invention is to provide the apparatus wherein the unsharp signal generating means (40) comprises means for generating an average signal (Uaveij) or a median signal (Umedij) in a region near the point of interest (i, j).

A yet further object of the present invention is to provide the apparatus further comprising subtracting means (54), multiplying means (58), and adding means (56), for generating a sharpness emphasized signal (S*ij) from the new image signal (S'ij) and the unsharp signal (Uij) according to the equation:

$$S^*ij=S'ij+K\cdot(S'ij-Uij)$$

where K is a coefficient signal.

Another object of the present invention is to provide the apparatus further comprising unsharp signal generating means (80) for generating an unsharp signal (U'ij) from the new image signal (S'ij), and subtracting means (54), multiplying means (58), and adding means (56) for generating a sharpness emphasized signal (S*ij) from the new image signal (S'ij) and the unsharp signal (U'ij) according to the equation:

$$S^*ij=S'ij+K\cdot(S'ij-U'ij)$$

where K is a coefficient signal.

Still another object of the present invention is to provide the apparatus wherein the coefficient signal K and the differential signal (S'ij Uij) are replaced respectively with a function signal (K(S'ij)) with the image signal (S'ij) as a variable and a function signal (F(S'ij−Uij)) the differential signal (S'ij−Uij) as a variable, and the sharpness emphasized signal (S*ij) is generated according to the equation:

$$S^*ij=S'ij+K(S'ij)\cdot F(S'ij-Uij).$$

Yet another object of the present invention is to provide the apparatus wherein the coefficient signal K and the differential signal (S'ij U'ij) are replaced respectively with a function signal (K(S'ij)) with the image signal (S'ij) as a variable and a function signal (F(S'ij U'ij)) with the differential signal (S'ij−U'ij) as a variable, and the sharpness emphasized signal (S*ij) is generated according to the equation:

$$S^*ij=S'ij+K(S'ij)\cdot F(S'ij-U'ij).$$

Yet still another object of the present invention is to provide the apparatus wherein a sharpness emphasized signal (S*ij) is generated from the original image signal (Sij), the new image signal (S'ij), and the unsharp signal (Uij) according to the equation:

$$S^*ij=Sij+K\cdot(S'ij-Uij)$$

where K is a coefficient signal.

A further object of the present invention is to provide the apparatus wherein a sharpness emphasized signal (S*ij) is generated from the original image signal (Sij), the new image signal, and an unsharp signal (U'ij) produced from the new image signal (S'ij), according to the equation:

$$S^*ij=Sij+K\cdot(S'ij-U'ij)$$

where K is a coefficient signal.

A still further object of the present invention is to provide the apparatus wherein the coefficient signal K and the differential signal (S'ij Uij) are replaced respectively with a function signal (K(Sij)) with the original image signal (Sij) as a variable and a function signal (F(S'ij−Uij)) with the differential signal (S'ij−Uij) as a variable, and the sharpness emphasized signal (S*ij) is generated according to the equation:

$$S^*ij = Sij + K(Sij) \cdot F(S'ij - Uij).$$

A yet further object of the present invention is to provide the apparatus wherein the coefficient signal K and the differential signal (S'ij U'ij) are replaced respectively with a function signal (K(Sij)) with the original image signal (Sij) as a variable and a function signal (F(S'ij−U'ij)) with the differential signal (S'ij−U'ij) as a variable, and the sharpness emphasized signal (S*ij) is generated according to the equation:

$$S^*ij = Sij + K(Sij) \cdot F(S'ij - U'ij).$$

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 7 through 13 are block diagrams of sharpness emphasizers according to other embodiments of the present invention;

FIGS. 18(a) through 18(h) are diagrams illustrative of the operation of the sharpness emphasizer shown in FIG. 17.

DETAILED DESCRIPTION OF THE PREFERRED EMBODIMENTS

Figure 3:
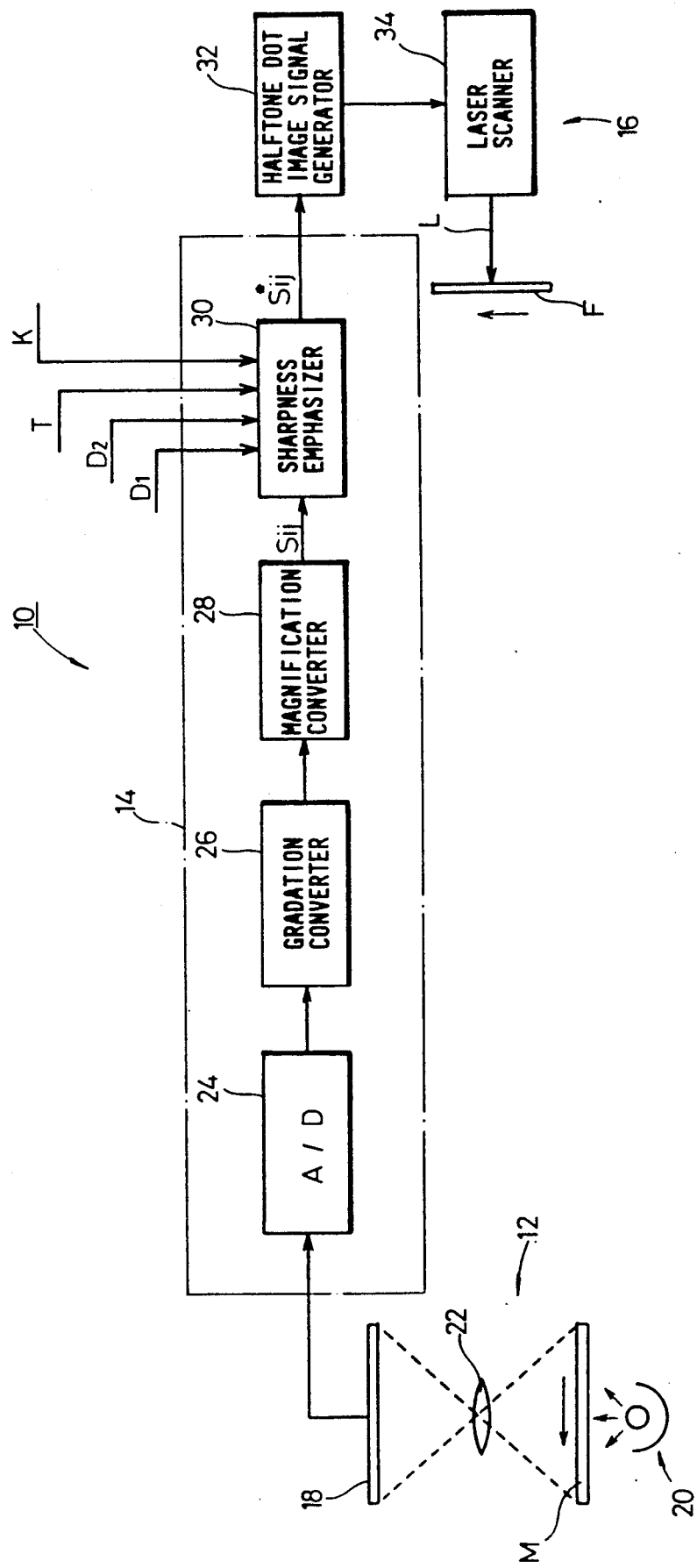
FIG. 3 is a block diagram of an image signal processing apparatus according to the present invention.

As shown in FIG. 3, an image scanning reading and reproducing system 10 to which an image signal processing method according to the present invention is applied is basically constructed of an image reading apparatus 12, an image signal processing apparatus 14, and an image reproducing apparatus 16.

The image reading apparatus 12 has a line sensor 18 comprising a linear array of photoelectric converter elements such as a CCD (charge-coupled device) for converting a light signal to an electric signal. The line sensor 18 reads image information on an original or subject M which is illuminated by a light source 20 and fed in an auxiliary scanning direction normal to the sheet of FIG. 3, by detecting light that has passed through the original M and been converged by a condenser lens 22 in a main scanning direction that is normal to the auxiliary scanning direction.

The image signal processing apparatus 14 comprises an A/D converter 24 for converting an analog signal from the line sensor 18 to a digital signal, a gradation converter 26 for converting the gradation of the digital signal, a magnification converter 26 for converting the magnification of the digital signal, and a sharpness emphasizer 30 for processing a digital image signal Sij from the magnification converter 28 based on unsharp mask data $D_1$, emphasis mask data $D_2$, a threshold signal T, and a coefficient signal K and for producing a sharpness emphasized signal S*ij.

The unsharp mask data $D_1$ are data corresponding to the type of a blurring mask used for electrically correcting the image signal Sij for sharpness. As described later on, an unsharp signal Uij at a point of interest (i, j) is calculated from an image signal in a region near the point of interest (i, j) in the image signal Sij. The unsharp mask data $D_1$ serve to specify the area near the point of interest (i, j). The emphasis mask data $D_2$ are employed when generating image emphasis signals $S_{Gij}$, $S_{Lij}$ (described later), and correspond to the number of pixels near the point of interest (i, j) in the image signal Sij.

The image reproducing apparatus 16 comprises a halftone dot image signal generator 32 for converting the sharpness emphasized signal S*ij from the sharpness emphasizer 30 to a binary signal of a certain halftone dot size based on a halftone dot signal, and a laser scanner 34 for turning on and off a laser beam L based on the binary signal and deflecting the turned-on/off laser beam L with a light deflector (not shown) to form a halftone dot image on a film F. The film F is fed in an auxiliary scanning direction indicated by the arrow while at the same time being scanned with the laser beam L in a main scanning direction normal to the auxiliary scanning direction, so that image information is two-dimensionally reproduced on the film F.

Figure 4:
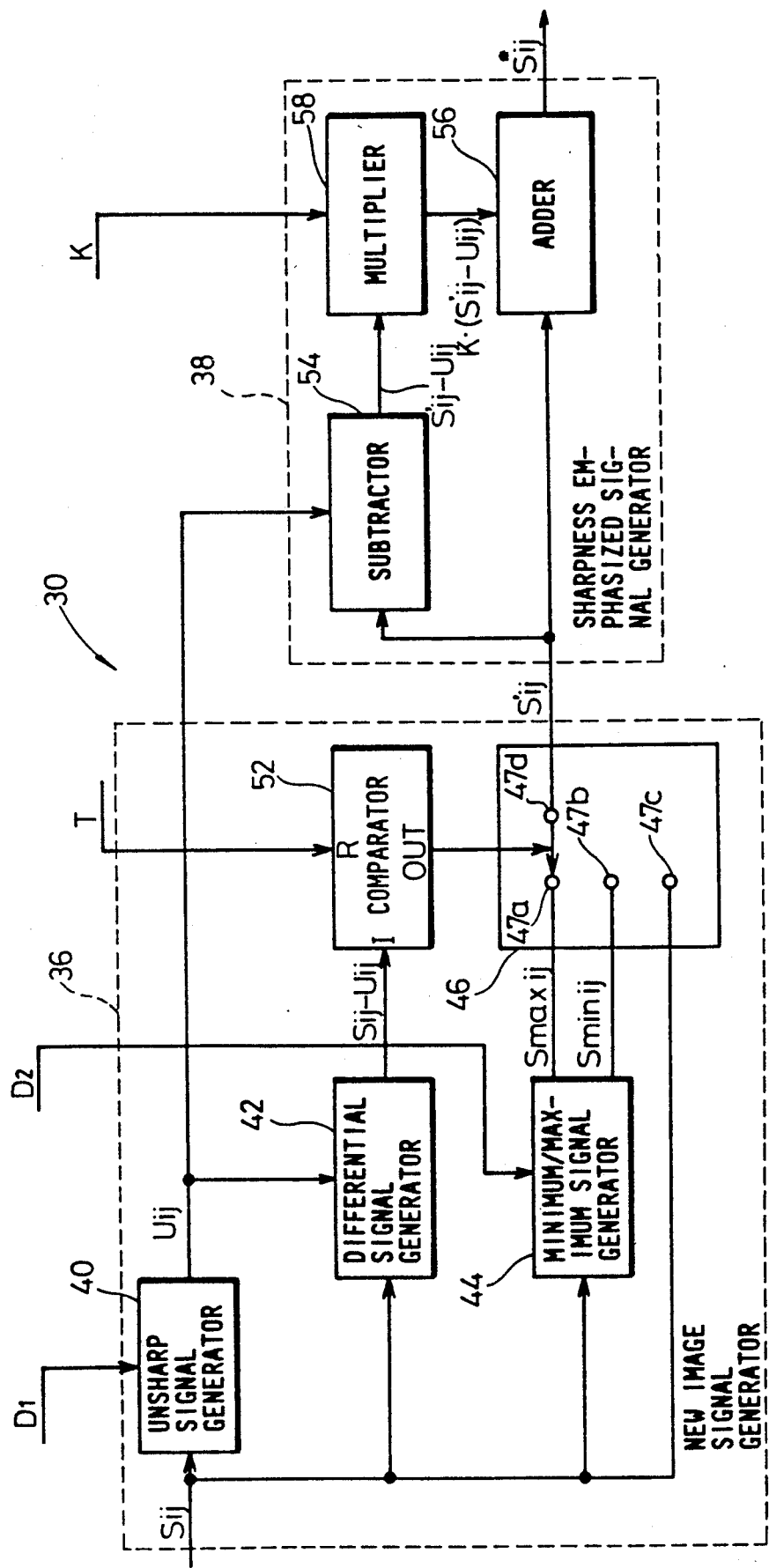
FIG. 4 is a block diagram of a sharpness emphasizer in the image signal processing apparatus shown in FIG. 3.

As shown in FIG. 4, the sharpness emphasizer 30 in the image signal processing apparatus 14 comprises a new image signal generator 36 for generating a new image signal S'ij and a sharpness emphasizing signal generator 38. An image signal Sij generated by the magnification converter 28 (FIG. 3) is applied to an unsharp signal generator 40 serving as an unsharp signal generating means, a differential signal generator 42 serving as a subtracting means, a minimum/maximum signal generator 44 serving as an image emphasis signal generating means, and a third contact 47c of a new image signal selector 46 serving as a new image signal selecting means. The unsharp signal generator 40 generates an unsharp signal Uij based on the unsharp mask data $D_1$, and applies the unsharp signal Uij to the differential signal generator 42, and a subtractor 54 serving as a subtracting means in the sharpness emphasizing signal generator 38.

The differential signal generator 42 is essentially a subtractor. A first differential signal Sij−Uij which is an output signal from the differential signal generator 42 is applied to a comparison input terminal I of a comparator 52 serving as a comparing means. The comparator 52 has a reference input terminal R supplied with a threshold signal T. The comparator 52 compares the differential signal Sij−Uij with the threshold signal T, and controls the new image signal selector 46 depending on the result of the comparison such that a common terminal 47d is connected to the first, second, or third contact 47a, 47b, or 47c.

The minimum/maximum signal generator 44 generates a maximum signal Smaxij (having a maximum value) and a minimum signal Sminij (having a minimum value) out of image signals in the region near the point of interest (i, j) which is determined by the emphasis mask data $D_2$. These maximum and minimum signals Smaxij, Sminij are applied to the first and second contacts 47a, 47b of the new image signal generator 46.

The new image signal selector 46 essentially comprises a multiplexer, and applies either the maximum signal Smaxij, the minimum signal Sminij, or the original image signal Sij, depending on the output signal from the comparator 52, as a new image signal S'ij to the subtractor 54 and one terminal of an adder 56 serving as an adding means in the sharpness emphasizing signal generator 38. A second differential signal S'ij−Uij which is an output signal from the subtractor 54 is multiplied by a coefficient signal K by a multiplier 58 serving as a multiplying means in the sharpness emphasizing signal generator 38. An output signal from the multiplier 58, indicative of the product K(S'ij−Uij), is then applied to the other input terminal of the adder 56. The adder 56 produces a sharpness emphasized signal S*ij.

The image scanning reading and reproducing system to which the image signal processing method is applied is basically constructed as described above. Operation and advantages of the system will be described below.

Image information borne by the original M illuminated by light from the light source 20 is carried by light that has passed through the original M, and photoelectrically read by the line sensor 18. At this time, the original M is fed in the auxiliary scanning direction by a feed mechanism (not shown), and is also scanned by the line sensor 18 in the main scanning direction indicated by the arrow, so that the image information on the entire surface of the original M is read out.

Then, the image information which has been photoelectrically converted by the line sensor 18 is converted by the A/D converter 24 to a digital image signal which is applied to the gradation converter 26. In the gradation converter 26, the gradation of the digital image signal is Converted based on read-out conditions of the image reading apparatus 12 and platemaking conditions of the image reproducing apparatus 16. Then, the gradation-converted image signal is converted in magnification, i.e., enlarged or reduced in size, by the magnification converter 28 based on the platemaking conditions. The image signal Sij which has thus been converted in gradation and magnification is introduced into the sharpness emphasizer 30. The image signal Sij is a digital signal as described above. For a better understanding of the present invention, however, a sharpness emphasizing process which is effected on an analog signal substantially equivalent to the digital image signal by the sharpness emphasizer 30 will be described below.

Figure 1:
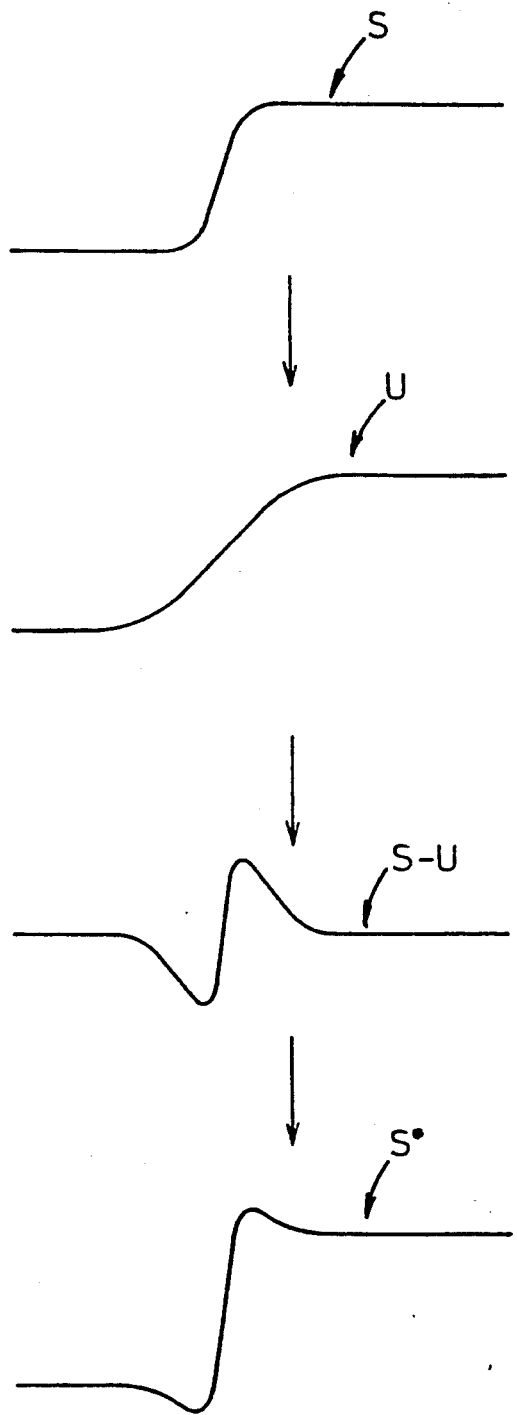
FIGS. 1 and 2(a) through 2(d) are diagrams illustrative of a conventional sharpness emphasis process.
Figure 2A:
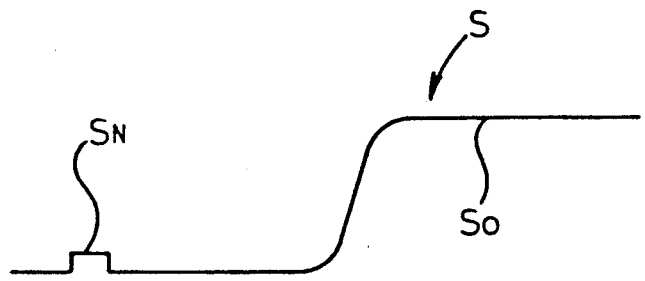
Figure 2B:
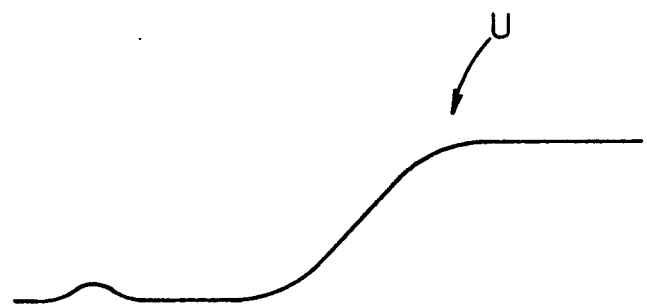
Figure 2C:
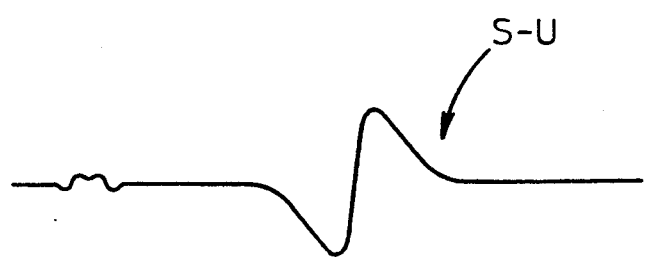
Figure 5A:
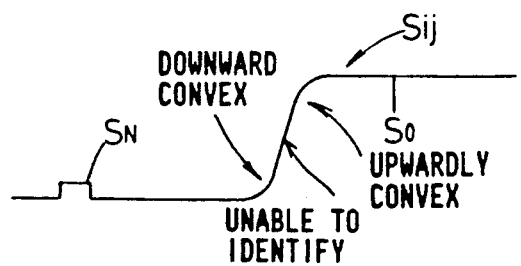
FIGS. 5(a) through 5(g) are diagrams illustrating the operation of the sharpness emphasizer shown in FIG. 4.

It is assumed in the illustrated embodiment that an image signal Sij is an analog signal comprising a noise component $S_N$ and a signal component $S_O$ as shown in FIG. 5(a). This image signal Sij is virtually the same as the signal shown in FIG. 2(a). The image signal Sij has a characteristic portion in its positive-going edge. More specifically, in a region where the signal component $S_O$ starts to increase, the derivative of a tangential line of the image signal Sij is gradually increased, i.e., the curve of the image signal Sij is downwardly convex. In a region where the signal $S_O$ stops increasing, the derivative of a tangential line of the image signal Sij is gradually reduced, i.e., the curve of the image signal Sij is upwardly convex. The central region of the rising curve of the signal component $S_O$ has an inflection point where the curve of the image signal Sij is neither downwardly convex nor upwardly convex.

Figure 6:
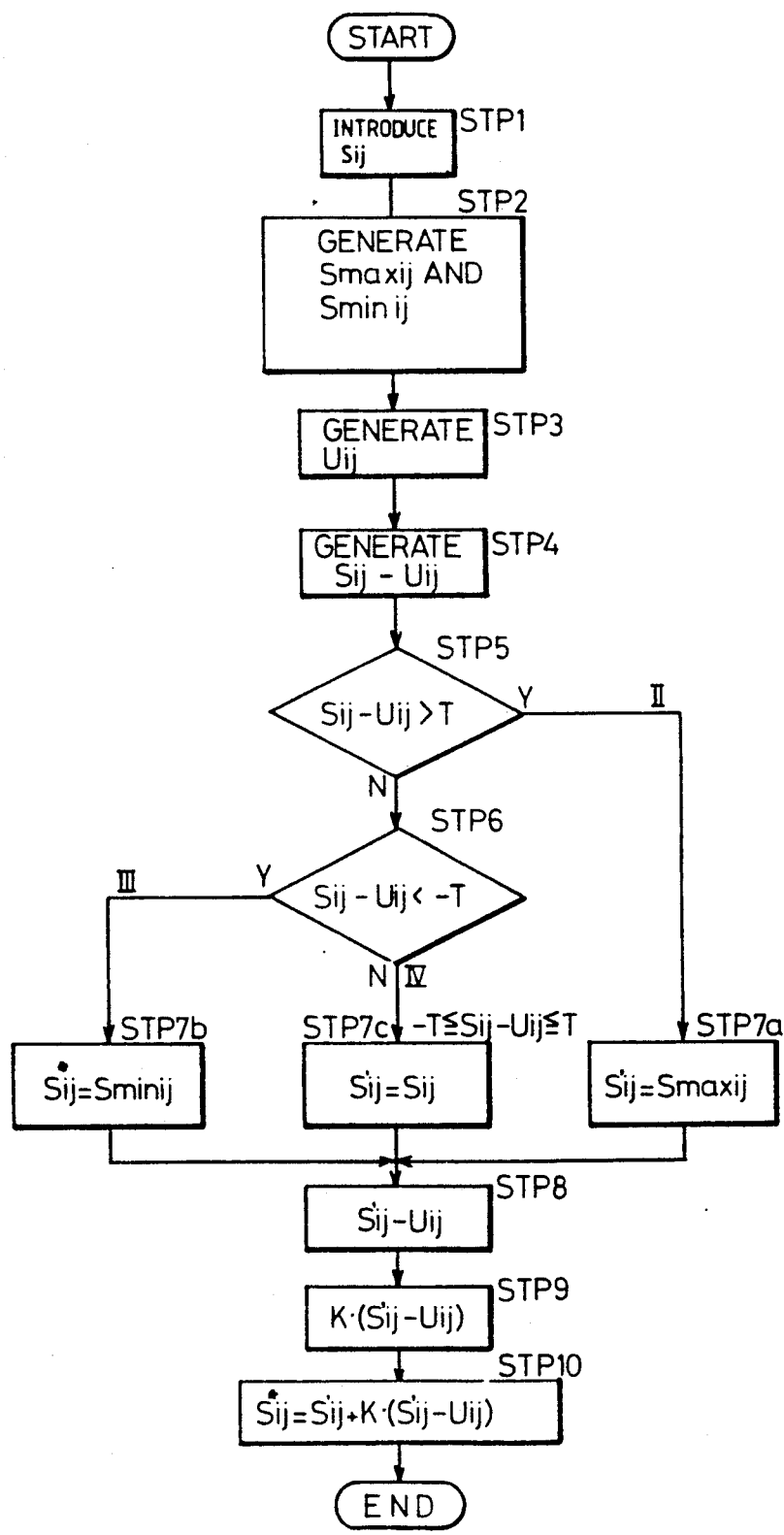
FIG. 6 is a flowchart of the operation of the sharpness emphasizer shown in FIG. 4.

The sharpness emphasizer 30 generates a new image signal S'ij and a sharpness emphasized signal S*ij according to a flowchart shown in FIG. 6. The flowchart of FIG. 6 will be described below.

The image signal Sij is applied to the minimum/maximum signal generator 44, the unsharp signal generator 40, the differential signal generator 42, and the third contact 47c of the new image signal selector 46 in a step 1.

The minimum/maximum signal generator 44 generates maximum pixel data (corresponding to the maximum signal Smaxij) and minimum pixel data (corresponding to the minimum signal data Sminij) out of the emphasis mask data $D_2$, e.g., 3×3 pixel data near the pixel at a point of interest (i, j) in the image signal Sij, and supplies the maximum and minimum pixel data to the first and second contacts 47a, 47b of the new image signal selector 46 in a step 2. The emphasis mask data D, are not limited to 3×3 pixel data, but may be of a size of 5×5 pixels, 3×5 pixels, or the like.

Figure 5B:

The unsharp signal generator 40 generates an unsharp signal Uij (see FIG. 5(b)) as a local average signal based on the average of the unsharp mask data $D_1$, e.g., 11×11 pixel data around the pixel data at the point of interest (i, j) in the image signal Sij, and the unsharp signal Uij is applied to the differential signal generator 42 in a step 3. The data size of the unsharp mask data $D_1$ is not limited to 11×11 pixels, bu may be 9×15 pixels, or 13×13 pixels, 9×15 pixels, or the like.

Figure 5C:
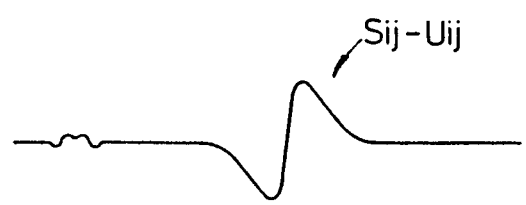

After a differential signal Sij−Uij (see FIG. 5(c)) has been generated by the differential signal generator 42, the differential signal Sij−Uij is applied to the comparison input terminal I of the comparator 52 in a step 4. At this time, the reference input terminal R of the comparator 52 is supplied with a threshold signal T (indicated by the dot-and-dash line in FIG. 5(d)), which indicates zero or a positive constant, entered by the operator through a control panel (not shown), for example. The comparator 52 compares the differential signal Sij−Uij and the threshold signal T according to the following inequalities (2) through (4) in steps 5 and 6:

$$Sij - Uij > T \rightarrow \text{upwardly convex} \quad (2)$$

$$Sij - Uij < -T \rightarrow \text{downwardly convex} \quad (3)$$

$$-T \leq Sij - Uij \leq T \rightarrow \text{otherwise} \quad (4)$$

Figure 5D:
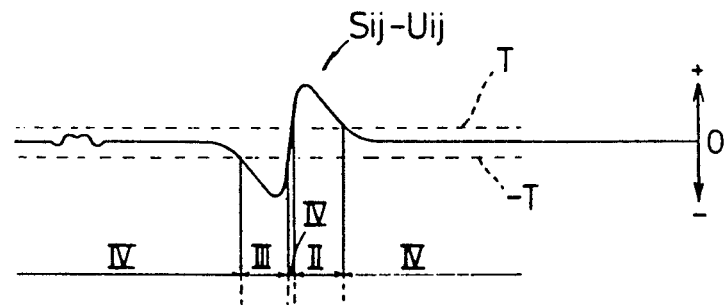

As shown in FIG. 5(d), the inequality (2) is satisfied in a region II, the inequality (3) in a region III, and the inequality (4) in regions IV. Depending on the regions II, III, and IV, the output terminal OUT of the comparator 52 applies a two-bit binary signal, for example, to an actuator (not shown) for the common contact 47d of the new image signal selector 46.

The common contact 47d is connected to the contact 47a, 47b, 47c according to the binary signal which is applied depending on the regions II, III, and IV. Therefore, the actuator for the common contact 47d can be arranged such that a new image signal S'ij is produced by the new image signal selector 46 according to the following equations (5) through (7) in steps 7a, 7b, and 7c.

$$Sij - Uij > T \rightarrow S'ij = Smaxij \qquad (5)$$

$$Sij - Uij < -T \rightarrow S'ij = Sminij \qquad (6)$$

$$-T \leq Sij - Uij \leq T \rightarrow S'ij = Sij \qquad (7)$$

In the region II shown in FIG. 5(d), therefore, the maximum signal Smaxij is issued as the new image signal S'ij from the new image signal selector 46 to the sharpness emphasized signal generator 38. In the region III, the minimum signal Sminij is issued as the new image signal S'ij from the new image signal selector 46 to the sharpness emphasized signal generator 38. In the regions IV, the original image signal Sij is issued as the new image signal S'ij from the new image signal selector 46 to the sharpness emphasized signal generator 38.

Figure 5E:
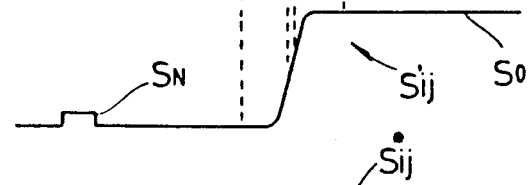

As shown in FIG. 5(e), the new image signal S'ij contains the original noise component $S_N$ of the image signal Sij, with the positive-going edge of the signal component $S_O$ being made steeper than it was in the image signal Sij. That is, the noise component $S_N$ is not emphasized, but the positive-going edge, which is the characteristic portion of the signal component $S_O$, is emphasized.

Then, a second differential signal S'ij−Uij indicating the difference between the new image signal S'ij and the unsharp signal Uij is generated by the subtractor 54 in a step 8. In the multiplier 58, the second differential signal S'ij−Uij is multiplied by a coefficient K representing the degree, specified by the operator, to which the image signal is to be emphasized in sharpness, in a step 9.

Then, the adder 56 effects an addition indicated by the equation (8) below, and produces a sharpness emphasized signal S*ij (see FIG. 5(f)) in a step 10.

$$S^*ij = S'ij + K \cdot (S'ij - Uij) \qquad (8)$$

Therefore, the sharpness emphasized signal S*ij is a signal which is processed according to the equation (9) when the condition Sij−Uij>T is satisfied, a signal which is processed according to the equation (10) when the condition Sij−Uij<−T is satisfied, and a signal which is processed according to the equation (11) when the condition −T≦Sij−Uij≦T is satisfied.

$$Sij - Uij > T \rightarrow S^*ij = Smaxij + K \cdot (Smaxij - Uij) \qquad (9)$$

$$Sij - Uij < -T \rightarrow S^* = Sminij + K \cdot (Sminij - Uij) \qquad (10)$$

$$-T \leq Sij - Uij \leq T \rightarrow S^*ij = Sij + K \cdot (Sij - Uij) \qquad (11)$$

Figure 2D:
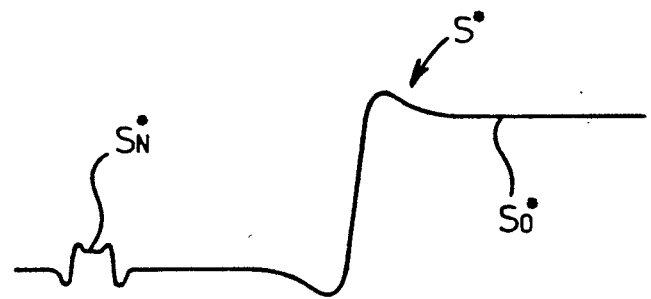
Figure 5F:
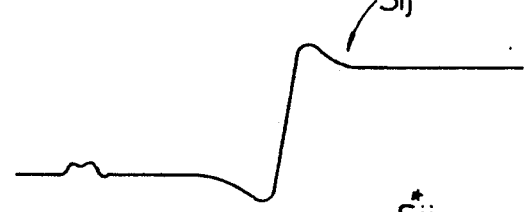

The sharpness emphasized signal S*ij thus generated is a signal which is produced, as shown in FIG. 5(f), when the new image signal S'ij is emphasized in sharpness. When the new image signal S'ij is emphasized in sharpness, both the signal component $S_O$ and the noise component $S_N$ are emphasized. However, as described above, the positive-going edge of the signal component $S_O$ is steeper than the positive-going edge of the image signal which is emphasized in sharpness according to the conventional process as shown in FIG. 2(d), and the noise component $S_N$ remains the same as that of the image signal which is conventionally emphasized in sharpness. Therefore, the degree of sharpness, i.e., the signal-to-noise ratio S/N of the sharpness emphasized signal S*ij is improved.

Figure 7:
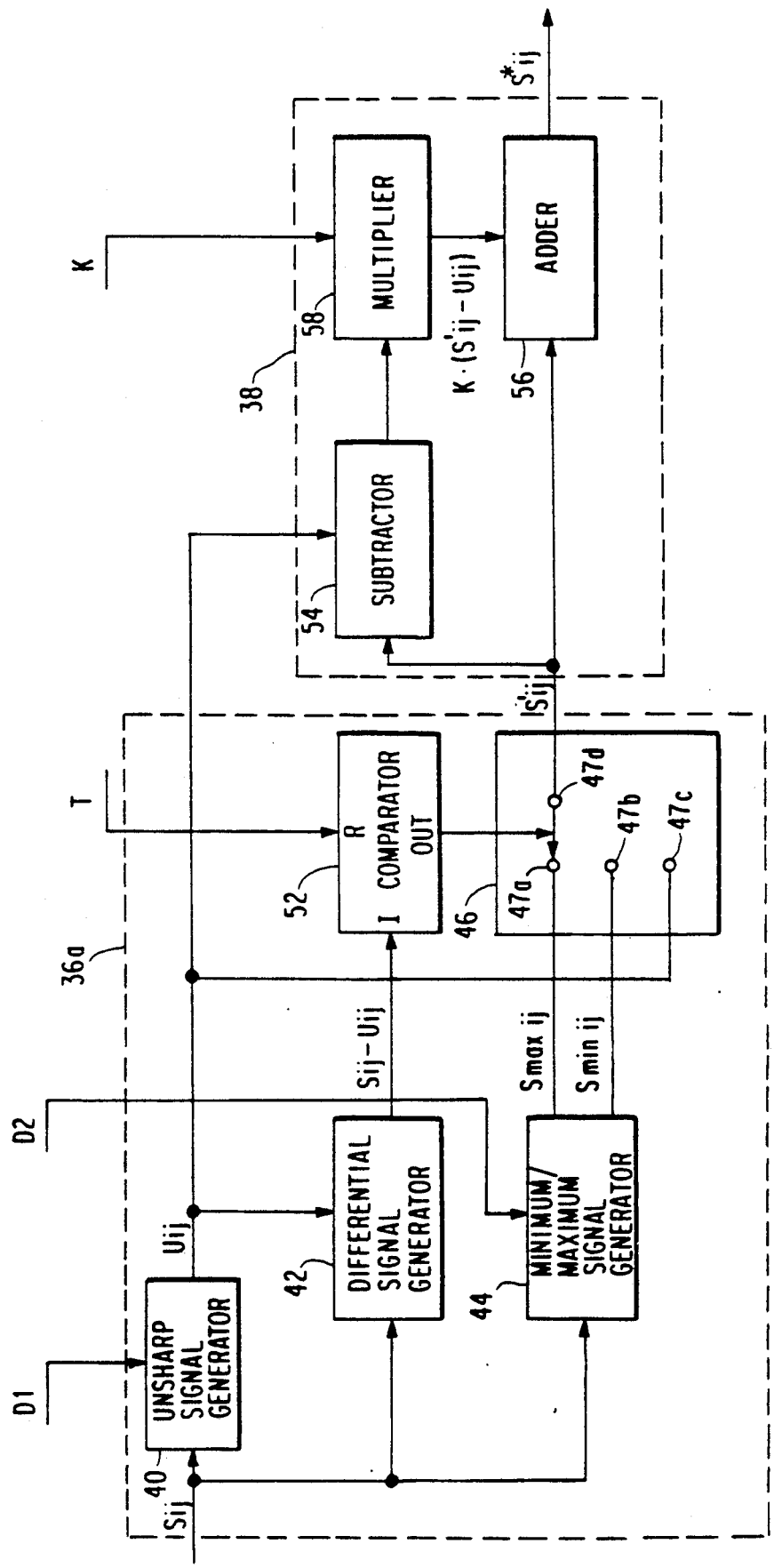

FIG. 7 shows a sharpness emphasizer according to another embodiment. The sharpness emphasizer includes a modified new image signal generator 36a in which the third contact 47c of the new image signal selector 46 may be supplied with the unsharp signal Uij, rather than the image signal Sij. According to the modification shown in FIG. 7, the signal processing in the step 7c shown in FIG. 6 is controlled as follows:

$$-T \leq Sij - Uij \leq T \rightarrow S'ij = Uij$$

Figure 5G:
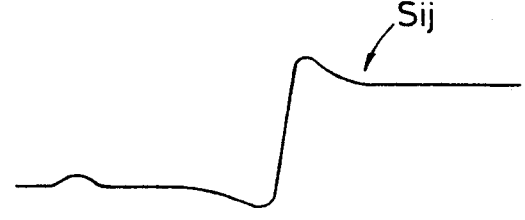

The sharpness emphasized signal S*ij produced by the arrangement shown in FIG. 7 has a waveform shown in FIG. 5(g). As shown in FIG. 5(g), the noise component $S_N$ of the image signal Sij is unsharpened, and only the signal component $S_O$ is emphasized in sharpness. Therefore, the signal-to-noise ratio S/N is improved to a greater degree.

The sharpness emphasized signal S*ij produced by the sharpness emphasizer 30 is then applied to the halftone dot image signal generator 32 (FIG. 3), which applies a binary signal that is pulse-width-modulated depending on the sharpness emphasized signal S*ij to the laser scanner 34. The laser scanner 34 applies a binary laser beam L that is deflected in the main scanning direction to the film F. Since the film F is fed in the auxiliary scanning direction at the same time, halftone dot image information is reproduced over the entire surface of the film F according to output conditions. The halftone dot image on the film F is then developed into a visible image by a developing device (not shown).

According to the image signal processing method of the present invention, as can be understood from the equations (5) through (7) and FIGS. 5(a), 5(d), and 5(e), the maximum signal Smaxij is selected in the region ($\approx$ the region II: upwardly convex) in which the gradient of the tangential line of the image signal Sij decreases, and the minimum signal Sminij is selected in the region ($\approx$ the region III: downwardly convex) in which the gradient of the tangential line of the image signal Sij increases.

Figure 8:
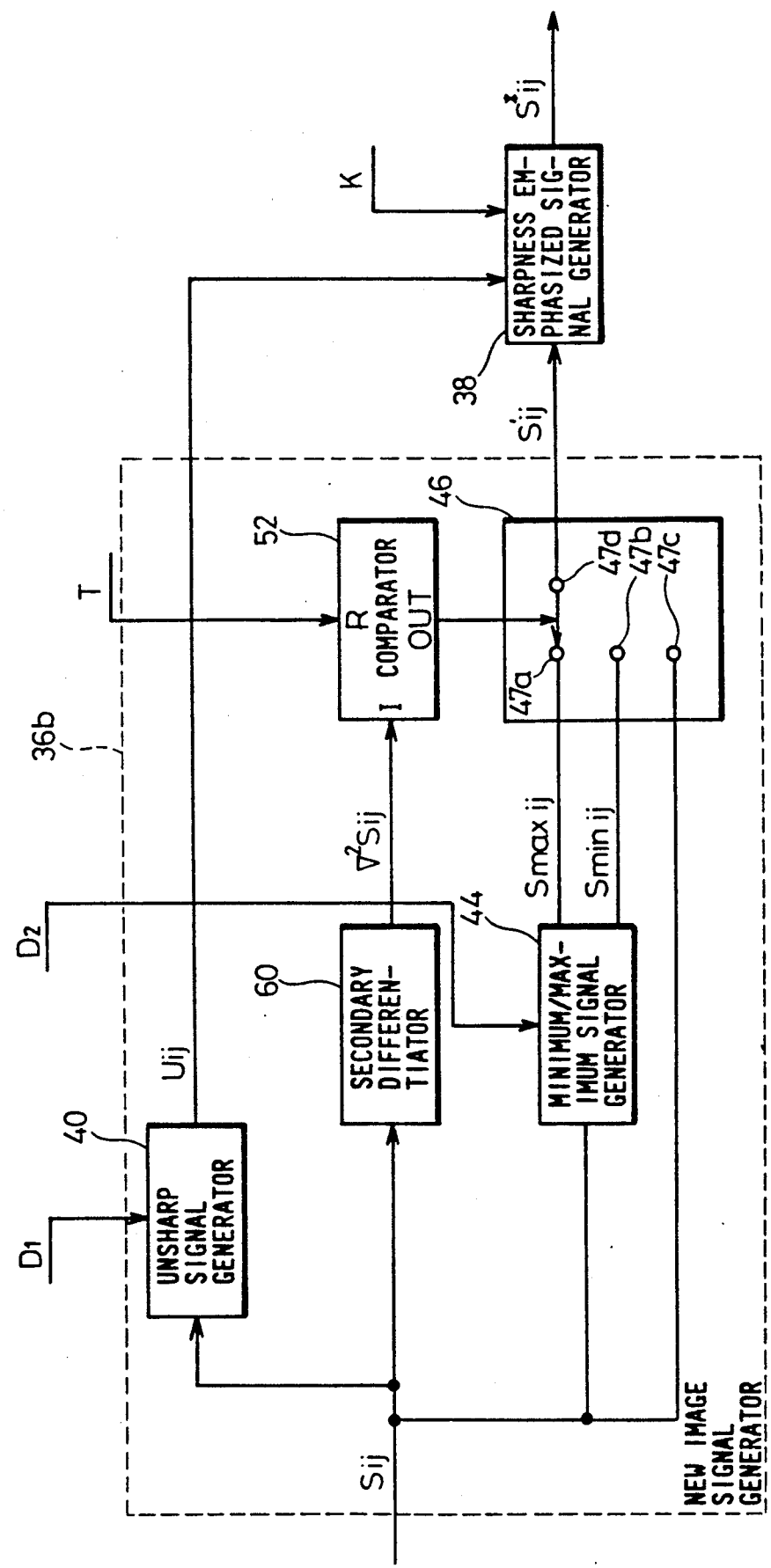

According to still another embodiment shown in FIG. 8, a modified new signal generator 36b includes a secondary differentiator 60 which is connected between the comparator 52 and the magnification converter 28. A Laplacian output signal $\nabla^2 Sij$ from the second differentiator 60 is applied to the comparison input terminal I of the comparator 52. Such a new image signal generator 36b can produce a new image signal S'ij according to the following equations:

$$\nabla^2 Sij < -T \rightarrow S'ij = Smaxij \qquad (12)$$

$$\nabla^2 Sij > T \rightarrow S'ij = Sminij \qquad (13)$$

$$-T \leq \nabla^2 Sij \leq T \rightarrow S'ij = Sij \qquad (14)$$

In the new image signal generator 36b, the third contact 47c of the new image signal selector 46 may be supplied with the unsharp signal Uij, rather than the image signal Sij, so that the result S'ij = Uij will be obtained by the equation (14) above.

Figure 9:
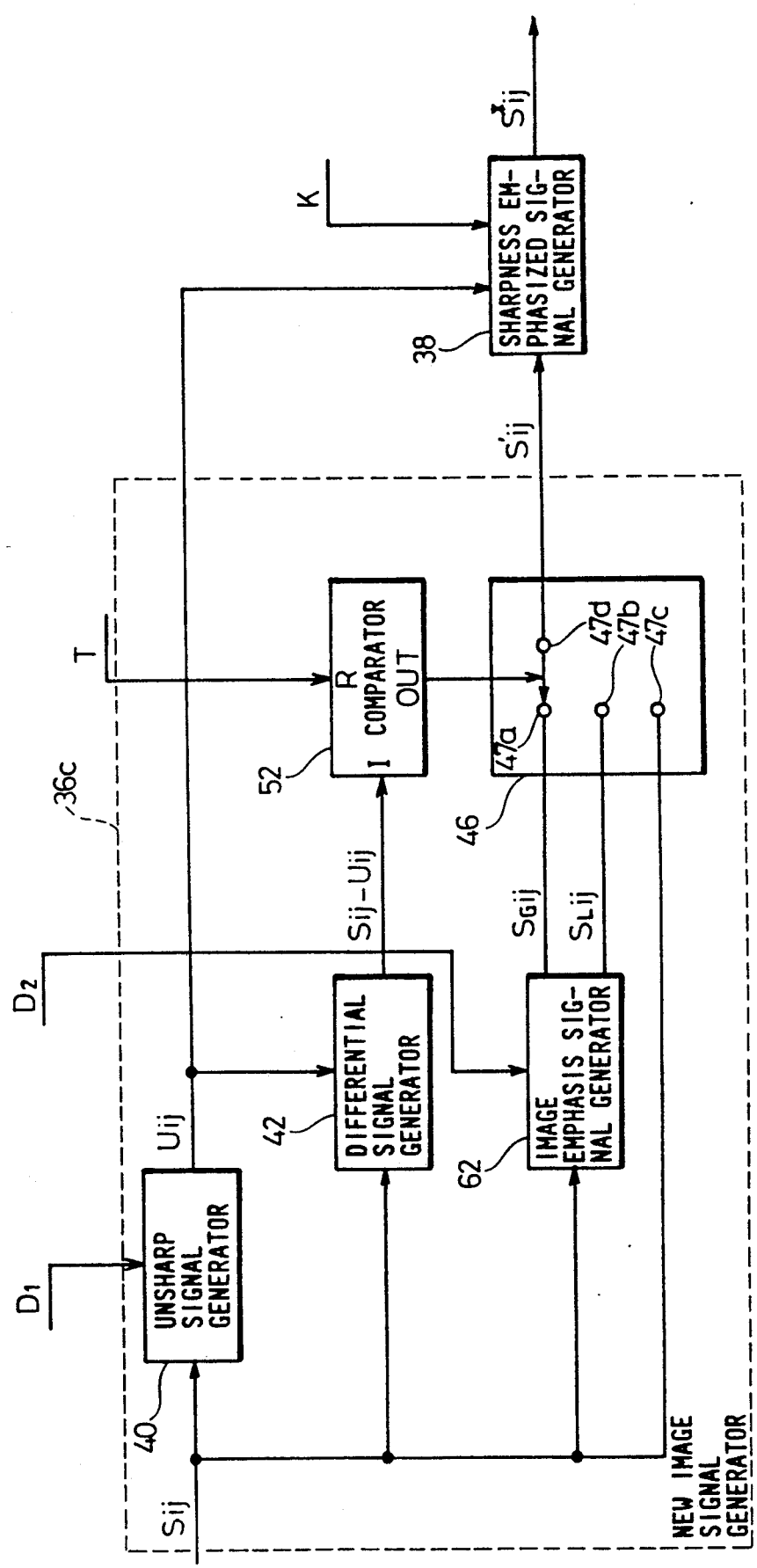
Figure 10:
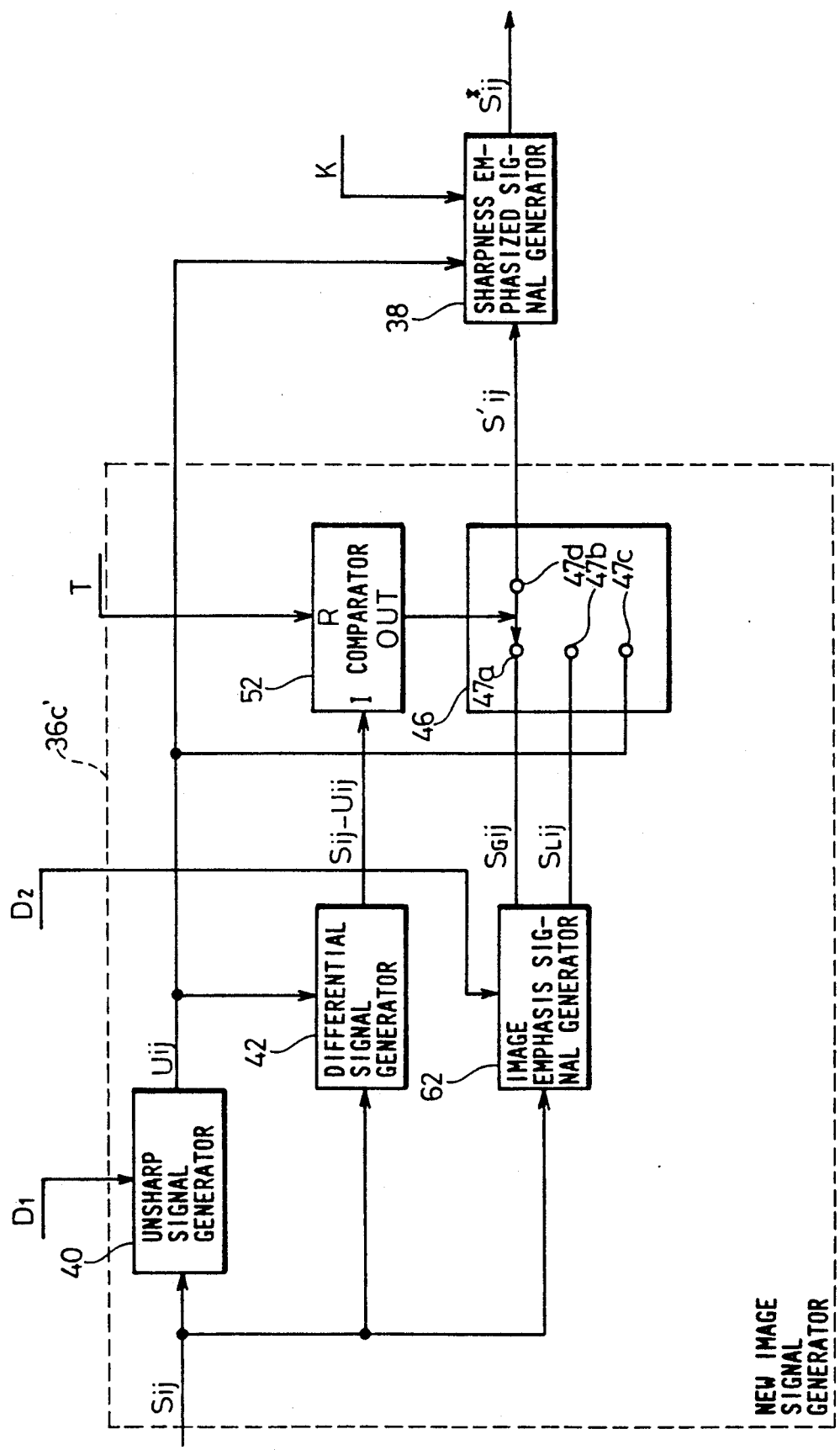
Figure 11:
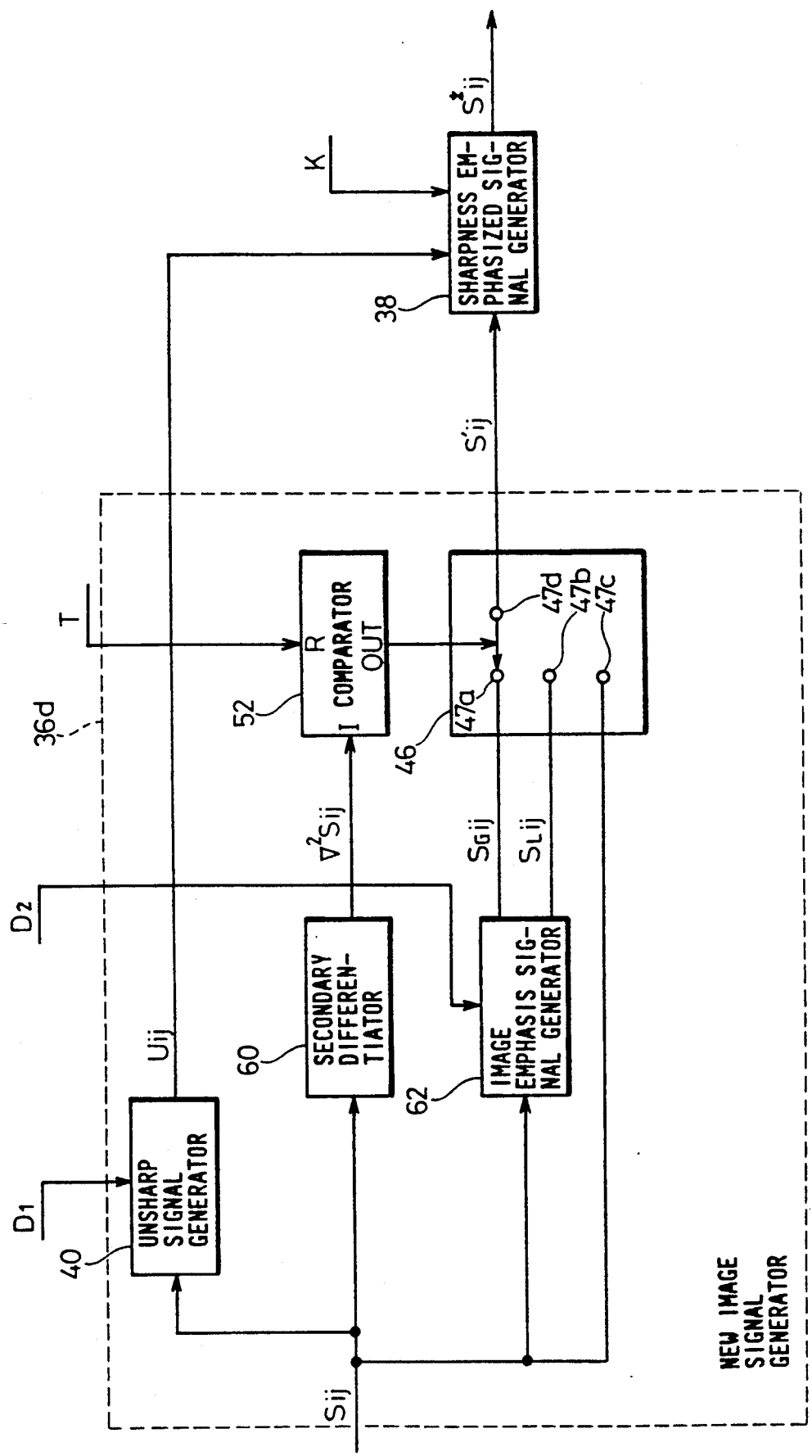

FIGS. 9 through 11 show new image signal generators 36c, 36c', 36d, respectively, according to still other embodiments. In the new image signal generators 36c, 36c', 36d, the minimum/maximum signal generators 44 shown in FIGS. 4, 7, and 8 are each replaced with an image emphasis signal generator 62 serving as an image emphasis signal generating means for generating image emphasis signals $S_Gij$, $S_Lij$. Rather than employing the maximum and minimum signals Smaxij, Sminij as the image emphasis signals $S_Gij$, $S_Lij$, constants t ($0<t<1$), t' ($0<t'<1$) may be introduced, and the image emphasis signals $S_Gij$, $S_Lij$ may be signals which correspond to internal dividing points with respect to the maximum and minimum signals Smaxij, Sminij and the original image signal Sij, as defined according to the following equations:

$$S_Gij = (1-t) \cdot Sij + t \cdot Smaxij \quad (15)$$

$$S_Lij = (1-t') \cdot Sij + t' \cdot Sminij \quad (16)$$

The equations for selecting the image emphasis signal $S_Gij$ or $S_Lij$ may be the following equations (17) through (19) corresponding to the equations (5) through (7) or the following equations (20) through (22) corresponding to the equations (12) through (14):

$$Sij - Uij > T \rightarrow S'ij = S_Gij \quad (17)$$

$$Sij - Uij < -T \rightarrow S'ij = S_Lij \quad (18)$$

$$-T \leq Sij - Uij \leq T \rightarrow S'ij = Sij \quad (19)$$

$$\nabla^2 Sij < -T \rightarrow S'ij = S_Gij \quad (20)$$

$$\nabla^2 Sij > T \rightarrow S'ij = S_Lij \quad (21)$$

$$-T \leq \nabla^2 Sij \leq T \rightarrow S'ij = Sij \quad (22)$$

Therefore, the degree to which the reproduced image is to be emphasized in sharpness can freely be selected by selecting the internal dividing points t, t'. The arrangements may be modified such that the results of the equations (19) and (22) are indicated by S'ij=Uij.

According to yet another embodiment of the present invention, limitations expressed by the equations (23), (24), given below, may be added to the image emphasis signals $S_Gij$, $S_Lij$ which have been produced as described above, so that a larger noise component can be suppressed. Employing a certain positive constant αS, the upper limit for the image emphasis signal $S_Gij$ is established as follows:ps $$S_Gij \leq Sij + \alpha S \quad (23)$$

and the lower limit of the image emphasis signal $S_Lij$ is established as follows:

$$S_Lij \geq Sij - \alpha S \quad (24)$$

Figure 12:
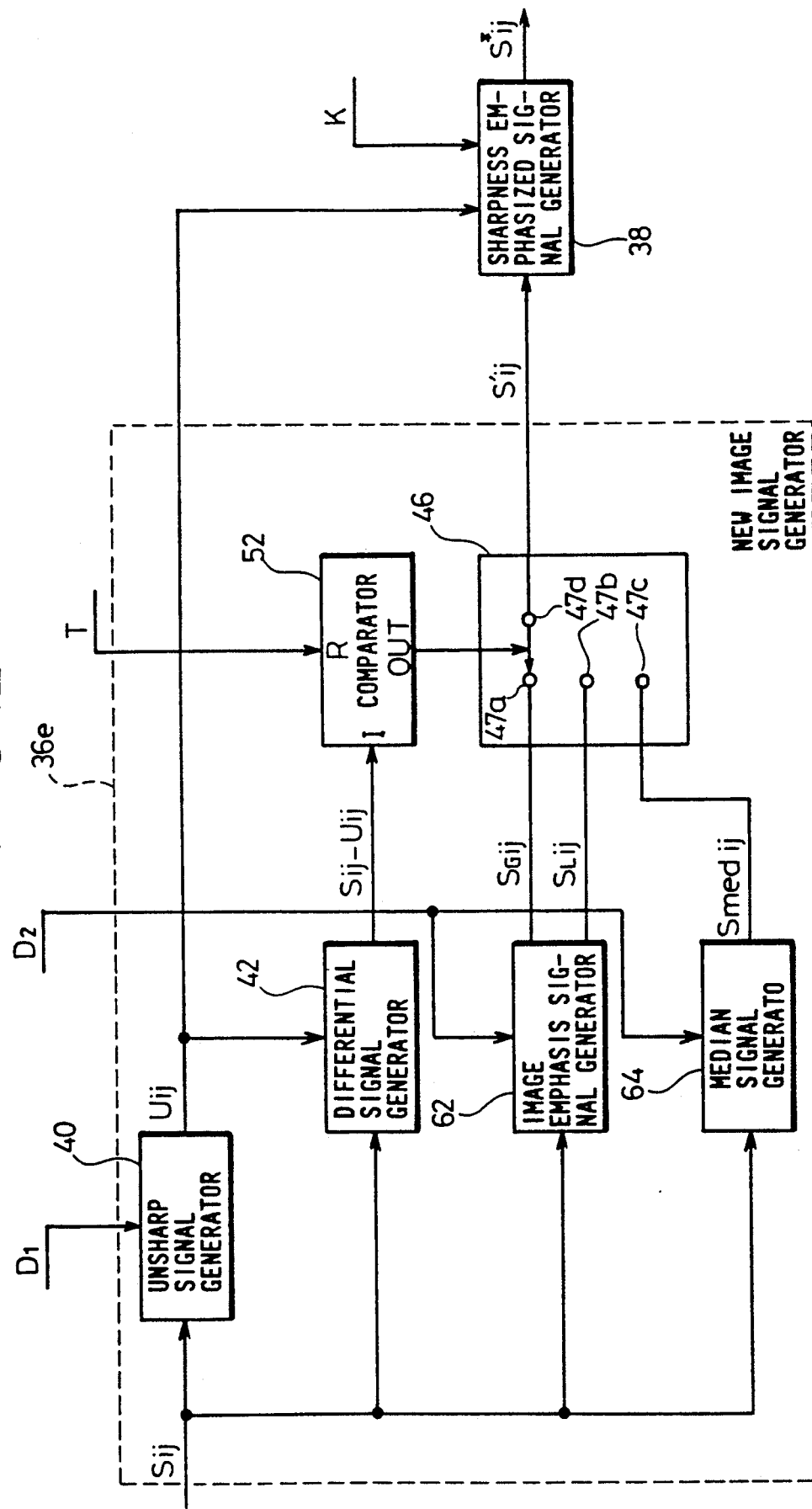

According to further embodiments, as shown in FIGS. 12 and 13, new image signal generators 36e, 36f include a median signal generator 64 for generating a median signal Smedij (having a central value) out of the emphasis mask data D2 is connected between the magnification converter 28 and the new image signal selector 46. The median signal Smedij may be used as the new signal S'ij when the inequality $-T \leq Sij - Uij = T$ or $-T\nabla^2 Sij \leq T$ is satisfied (see the following equation (25)).

$$-T \leq Sij - Uij \leq T \text{ or}$$

$$-T \leq \nabla^2 Sij \leq T \rightarrow S'ij = Smedij \quad (25)$$

Figure 14C:
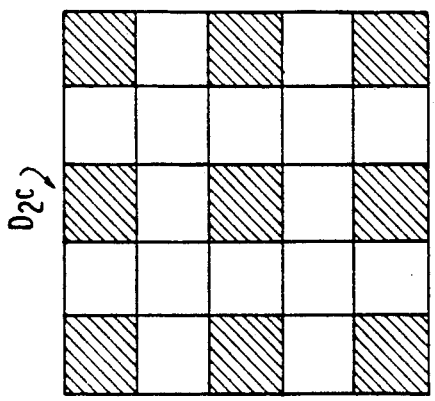
FIGS. 14(a) through 14(c) are schematic diagrams showing examples of emphasis mask data.
Figure 14B:
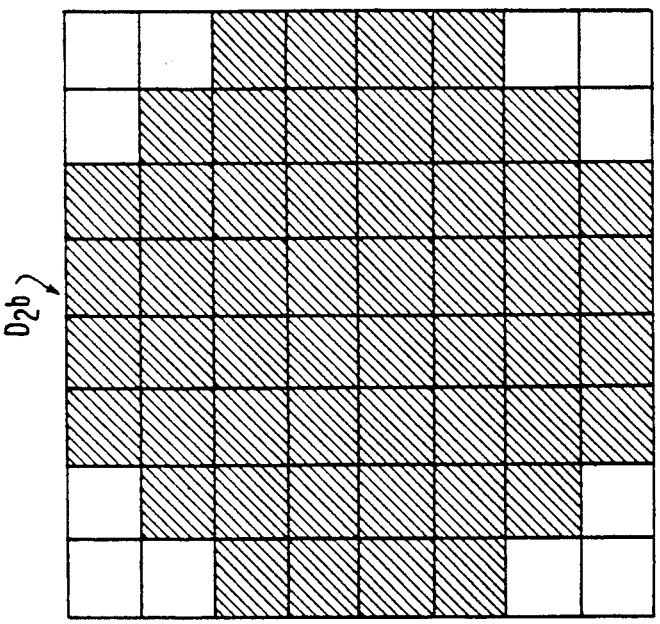
Figure 14A:
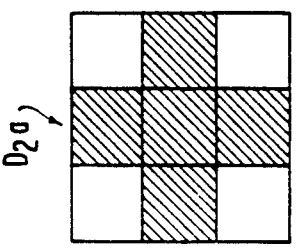

The emphasis mask data D, are not limited to rectangular pixel data as described above, but may be five pixel data D2a in a crisscross shape as shown hatched in FIG. 14(a), a selected number of pixel data D2b arranged in an approximately circular configuration as shown hatched in FIG. 14(b), or a selected number of scattered pixel data D2c provided by withdrawal of certain pixel data as shown hatched in FIG. 14(c). The unsharp mask data D1 may be arranged in a crisscross shape or any of various configurations, rather than a square shape.

In another embodiment, the unsharp signal Uij generated by the unsharp signal generator 40 may not be the local average signal which is produced on the basis of the unsharp mask data D1, but may be the median signal Umedij in the unsharp mask data D1. The local average signal is referred to as a local average signal Uaveij if it should be distinguished from the median signal Umedij.

With the above embodiments, the operator can effect various sharpness emphasis processes when reproducing image information, and can select an optimum sharpness emphasis process when such image information is reproduced.

Figure 15:
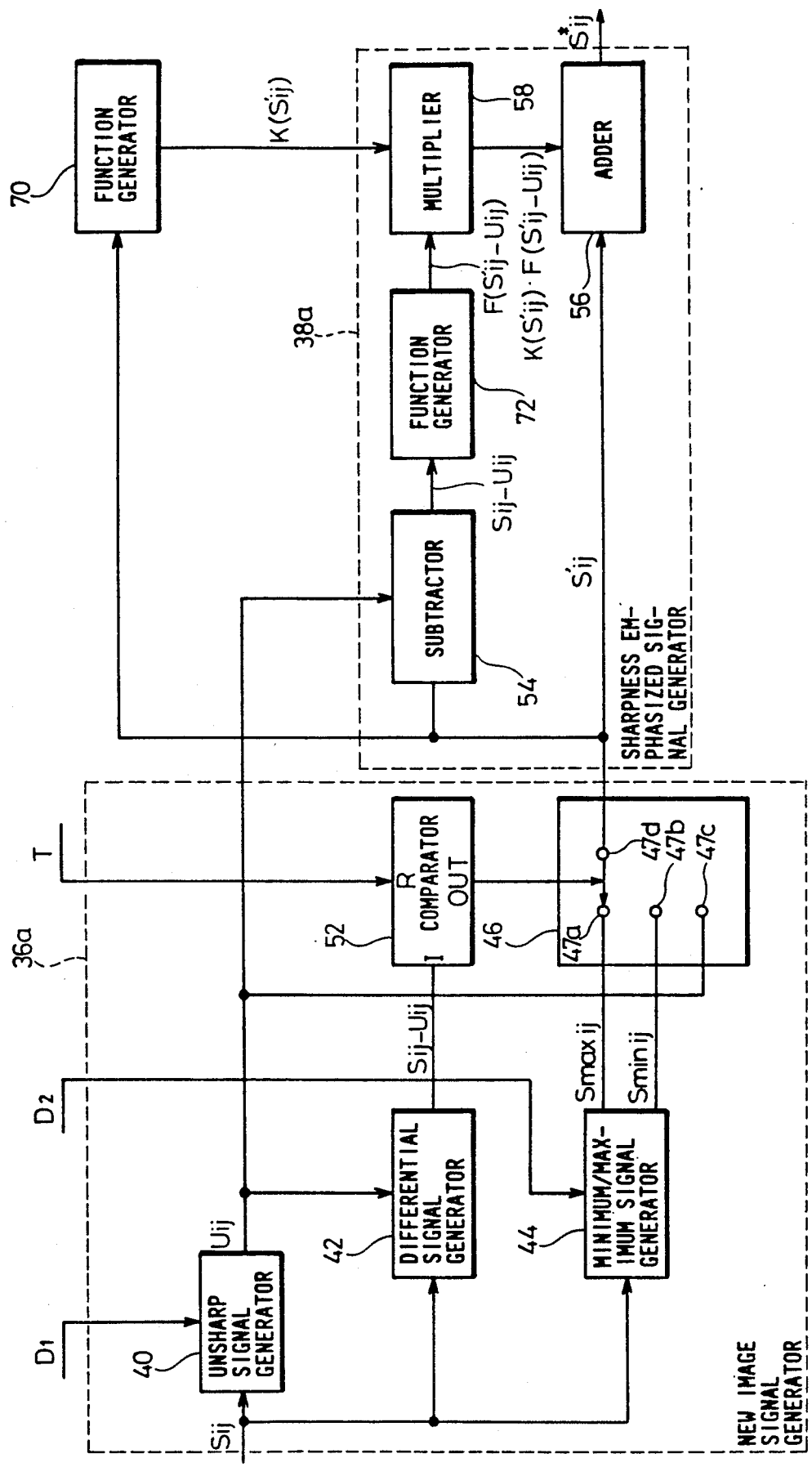
FIGS. 15 through 17 are block diagrams of sharpness emphasizers according to still other embodiments of the present invention.

FIG. 15 shows a sharpness emphasizer according to another embodiment of the present invention. In FIG. 15, the sharpness emphasizer includes a sharpness emphasized signal generator 38a. A function generator 70 is connected to the sharpness emphasized signal generator 38a, which includes another function generator 72. The function generator 70 generates a function signal K=K(S'ij) with the new image signal S'ij as a variable. The function generator 72 produces a function signal F(S'ij−Uij) with the second differential signal S'ij−Uij as a variable. The sharpness emphasized signal S*ij produced by the sharpness emphasized signal generator 38a is expressed by:

$$S^*ij = S'ij + K(S'ij) \cdot F(S'ij - Uij) \quad (26)$$

Figure 16:
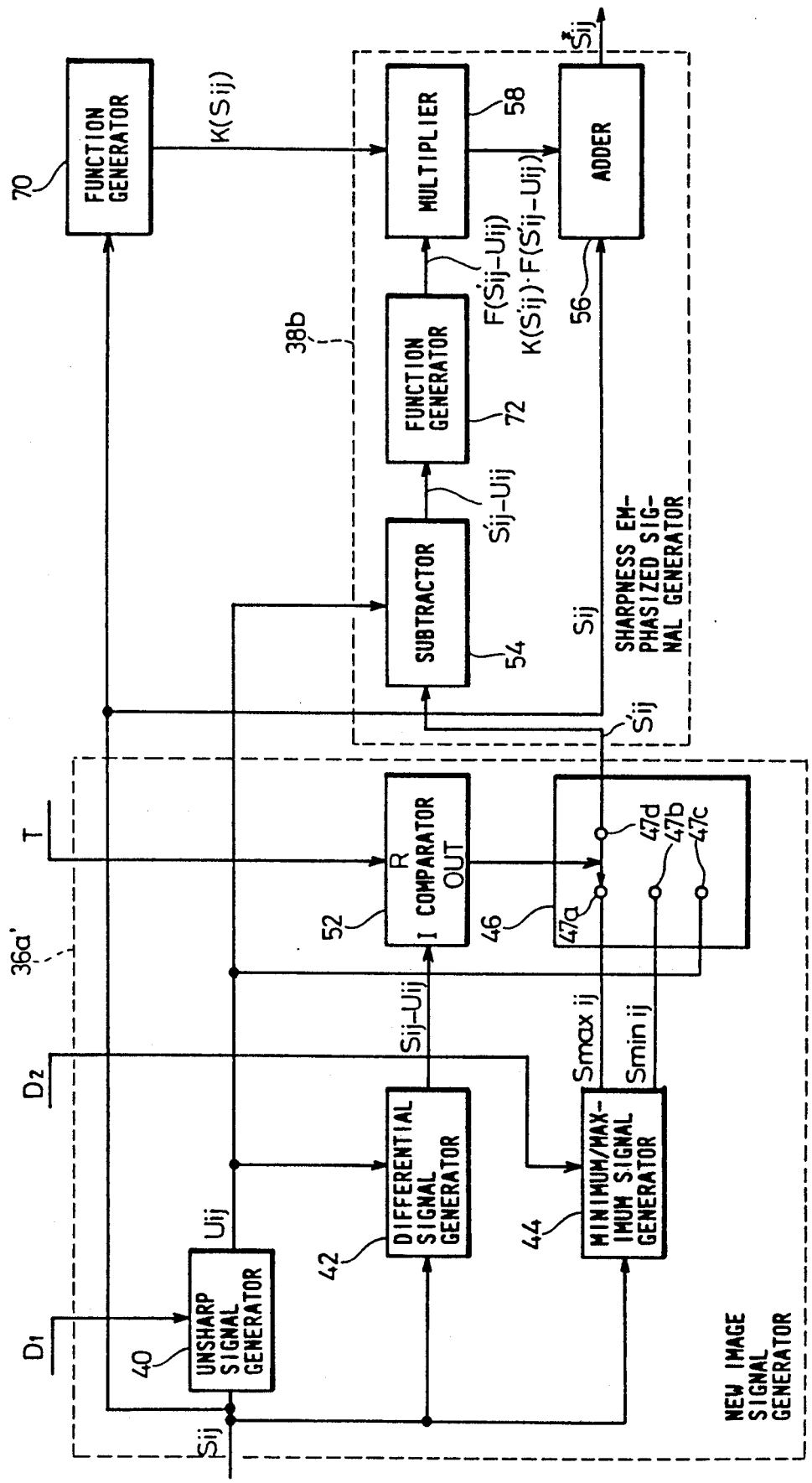

FIG. 16 illustrates a sharpness emphasizer according to still another embodiment of the present invention, which is similar to the sharpness emphasizer shown in FIG. 15. In FIG. 16, the sharpness emphasizer includes a new image signal generator 36a' which applies the original image signal Sij, rather than the new image signal S'ij, to the function generator 70 and the adder 56 in a sharpness emphasized signal generator 38b. The sharpness emphasized signal S*ij generated by the sharpness emphasized signal generator 38b is given as follows:

$$S^*ij = Sij + K(Sij) \cdot F(S'ij - Uij) \quad (27)$$

With the embodiments represented by the equations (26), (27), the operator can also effect various sharpness emphasis processes when reproducing image information, and can select an optimum sharpness emphasis process when such image information is reproduced.

Figure 17:
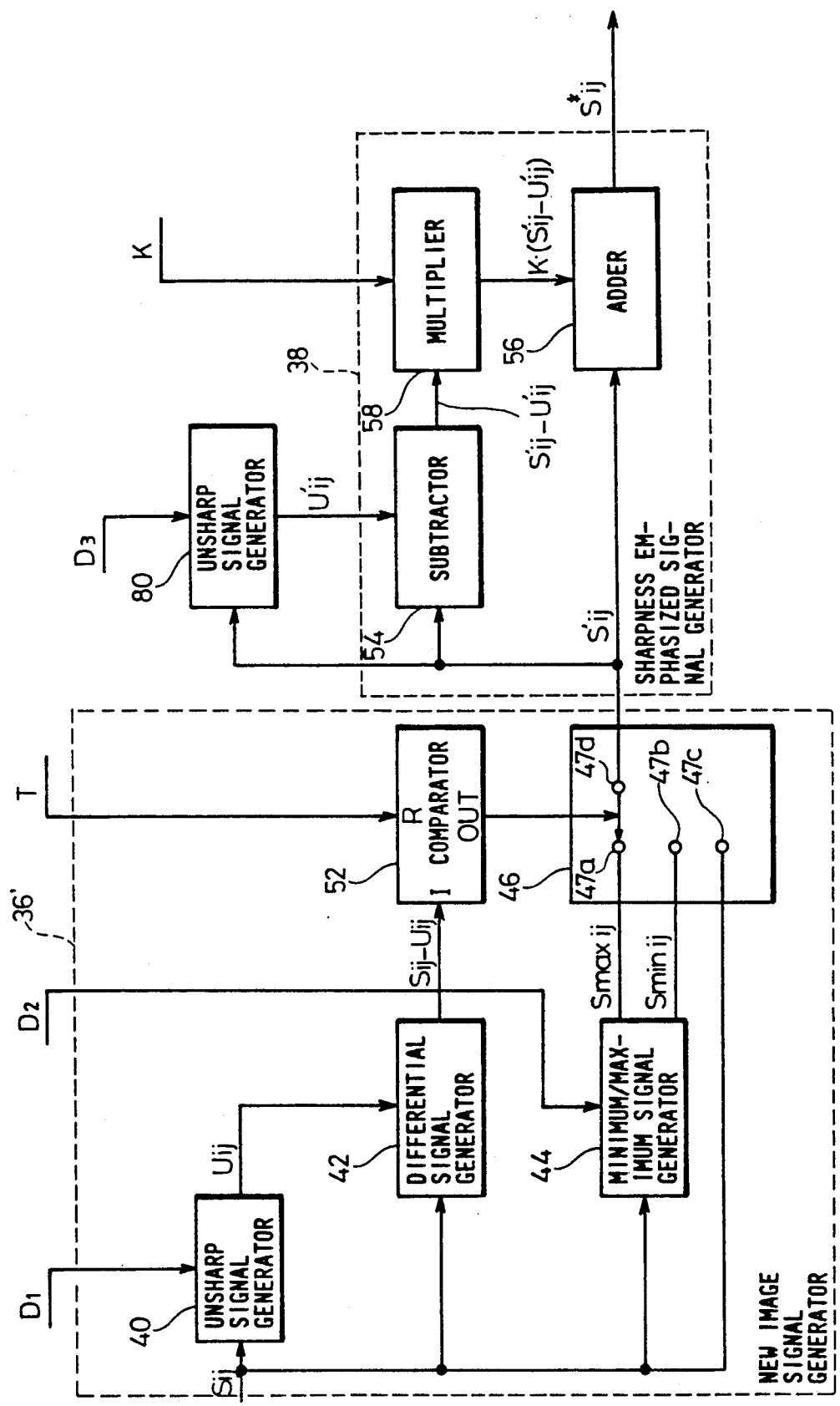

FIG. 17 shows a sharpness emphasizer according to still another embodiment of the present invention, and FIG. 18 shows the waveforms of generated signals in the sharpness emphasizer of FIG. 17. The sharpness emphasizer shown in FIG. 17 differs from the sharpness emphasizer 30 shown in FIG. 4 in that there is added an unsharp signal generator 80 for generating an unsharp signal U'ij to be applied to the subtractor 54. The new image signal generator is denoted 36' while the sharpness emphasized signal generator is denoted as 38'. The signal waveforms shown in FIGS. 18(a) through 18(e) are the same as the signal waveforms shown in FIGS. 5(a) through 5(e).

In the new unsharp signal generator 80, a second unsharp signal U'ij (see FIG. 18(f)) is generated on the basis of new unsharp mask data D3, e.g., the average value of 21×21 pixel data near new the point of interest (i, j) in the new image signal S'ij.

Then, a second differential signal S'ij−U'ij (FIG. 18(g)) indicating the difference between the new image signal S'ij and the second unsharp signal U'ij is generated by the subtractor 54. In the multiplier 58, the second differential signal S'ij−U'ij is multiplied by a coefficient K representing the degree, specified by the operator, to which the image signal is to be emphasized in sharpness.

Then, the adder 56 effects an addition indicated by the equation (28) below, and produces a sharpness emphasized signal S*ij (see FIG. 18(h)).

$$S^*ij = S'ij + K \cdot (S'ij - U'ij) \tag{28}$$

Therefore, the sharpness emphasized signal S*ij is a signal which is processed according to the equation (29) when the condition Sij−Uij>T is satisfied, a signal which is processed according to the equation (30) when the condition Sij−Uij<−T is satisfied, and a signal which is processed according to the equation (31) when the condition −T≦Sij−Uij≦T S*ij is satisfied.

$$Sij - Uij > T \rightarrow S^*ij = Smaxij + K \cdot (Smaxij - U'ij) \tag{29}$$

$$Sij - Uij < -T \rightarrow S^* = Sminij + K \cdot (Sminij - U'ij) \tag{30}$$

$$-T \leq Sij - Uij \leq T \rightarrow S^*ij = Sij + K \cdot (Sij - U'ij) \tag{31}$$

The sharpness emphasized signal S*ij thus generated contains the noise component $S_N$ which remains the same as the conventionally emphasized noise component. However, since the characteristic portion of the signal component $S_O$ is emphasized in sharpness to a greater degree, the degree of sharpness, i.e., the signal-to-noise ratio S/N of the sharpness emphasized signal S*ij is improved.

Figure 19:
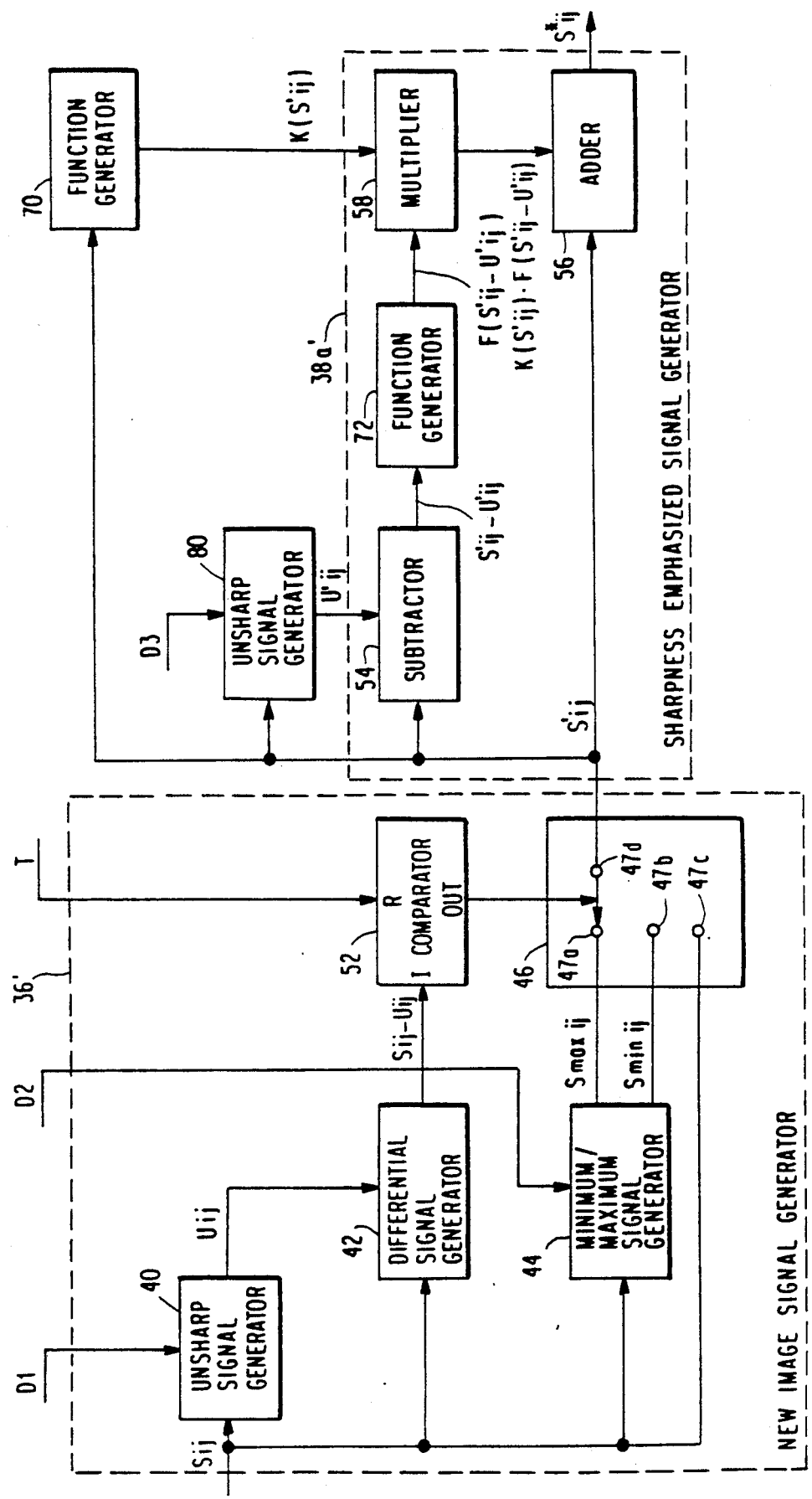
FIGS. 19 through 23 are block diagrams of sharpness emphasizers according to further embodiments of the present invention.

FIG. 19 shows a sharpness emphasizer according to another embodiment, which also includes the unsharp signal generator 80 and is similar to the sharpness emphasizer shown in FIG. 15. In FIG. 19, a function generator 70 is connected to the sharpness emphasized signal generator 38a', which includes another function generator 72. The function generator 70 generates a function signal K=K(S'ij) with the new image signal S'ij as a variable. The function generator 72 produces a function signal F(S'ij−U'ij) with the second differential signal S'ij−U'ij as a variable. The sharpness emphasized signal S*ij produced by the sharpness emphasized signal generator 38a is expressed by:

$$S^*ij = S'ij + K(S'ij) \cdot F(S'ij - U'ij) \tag{32}$$

Figure 20:
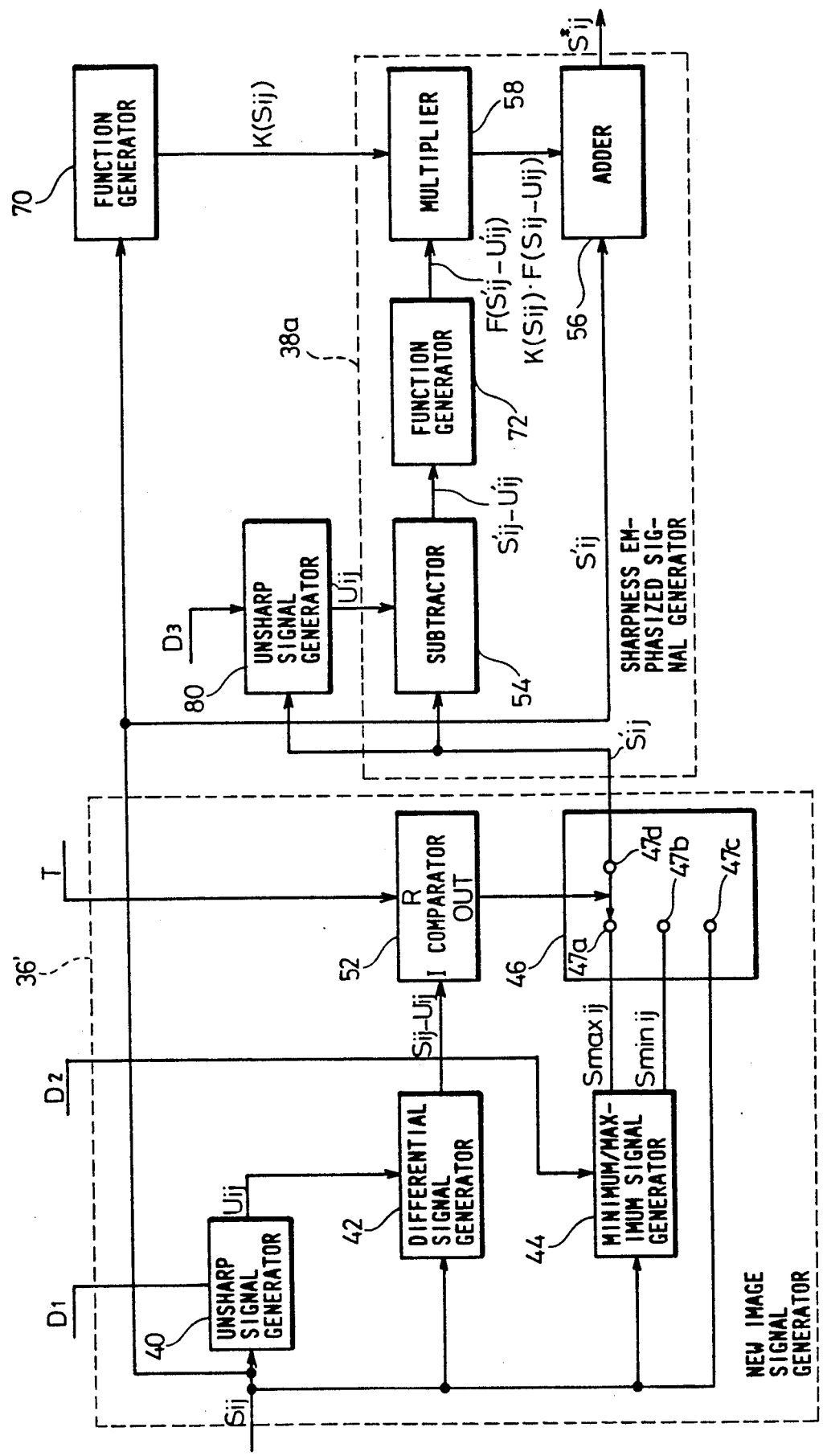

FIG. 20 illustrates a sharpness emphasizer according to still another embodiment of the present invention, which is similar to the sharpness emphasizer shown in FIG. 19. In FIG. 20, the new image signal generator 36' applies the original image signal Sij, rather than the new image signal S'ij, to the function generator 70 and the adder 56. The sharpness emphasized signal S*ij generated by the sharpness emphasized signal generator 36b is given as follows:

$$S^*ij = Sij + K(Sij) \cdot F(S'ij - U'ij) \tag{33}$$

With the embodiments represented by the equations (28) through (33), the operator can effect various sharpness emphasis processes when reproducing image information, and can select an optimum sharpness emphasis process when such image information is reproduced.

Figure 21:
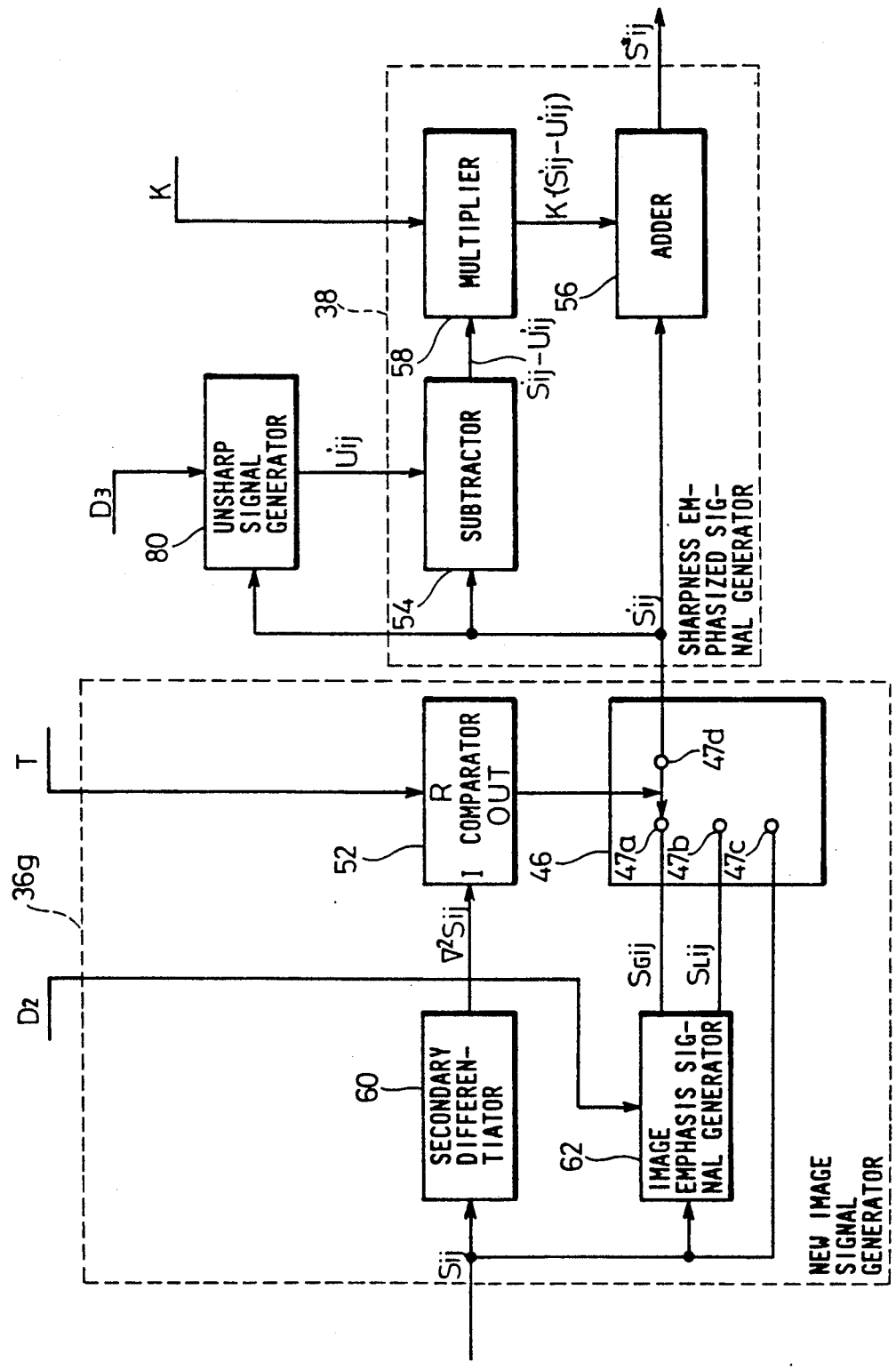
Figure 22:
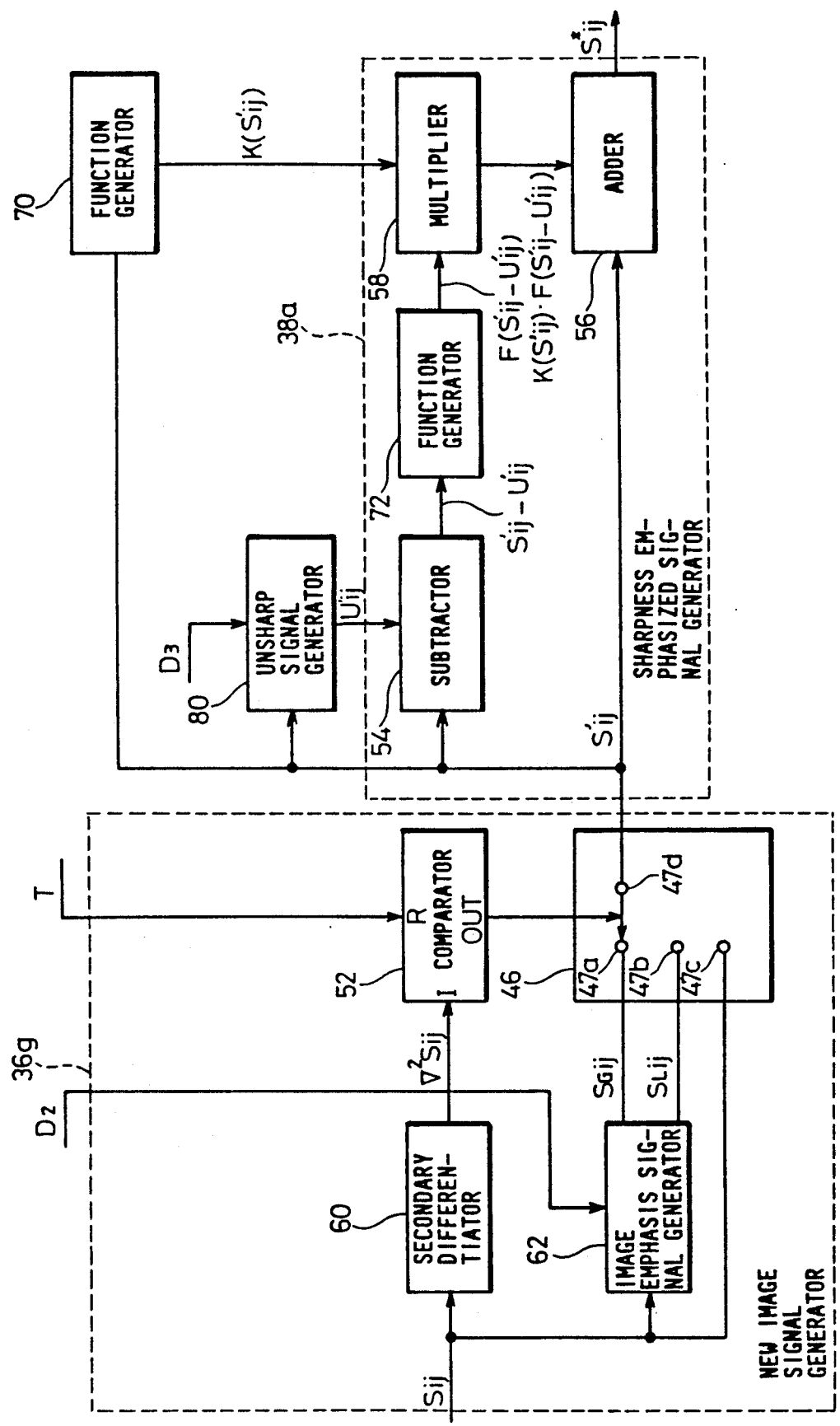
Figure 23:
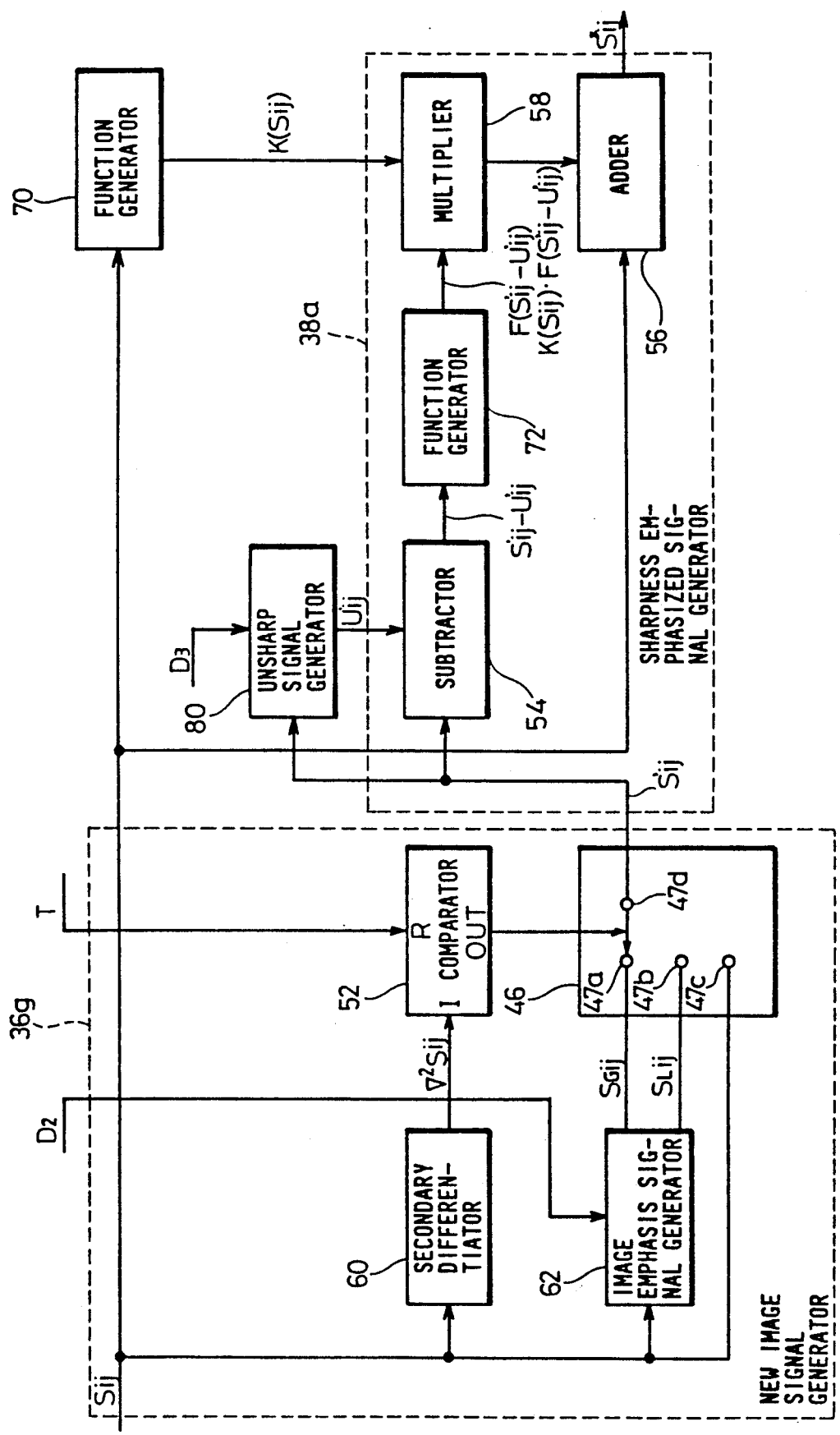

FIGS. 21 through 23 show sharpness emphasizers according to still further embodiments of the present invention. In each of these embodiments, the sharpness emphasizer includes a new image signal generator 36g in which the unsharp signal generator 40 and the differential signal generator 42 shown in FIGS. 17, 19, 20 are replaced with a secondary differentiator 60, and the minimum/maximum signal generator 44 is replaced with an image emphasis signal generator 62 which includes such a minimum/maximum signal generator. The sharpness emphasizers shown in FIGS. 21 through 23 can perform a sharpness emphasizing process indicated by the following equations:

$$S^*ij = S'ij + K \cdot (S'ij - U'ij) \tag{34}$$

$$S^*ij = S'ij + K(S'ij) \cdot F(S'ij - U'ij) \tag{35}$$

$$S^*ij = Sij + K(Sij) \cdot F(S'ij - U'ij) \tag{36}$$

With the present invention, as described above, an image signal is corrected depending on the increase or decrease of the derivative of a tangential line of the waveform of an image signal, before it is emphasized in sharpness at a signal level point higher or lower than a predetermined level. Therefore, any noise component of the image signal is not emphasized, but only the characteristic portion of the signal component of the image signal is emphasized in sharpness. As a result, the profile of the image represented by the image signal is emphasized, and the reproduced image is high in quality. Various sharpness emphasizing modes can be selected, and the sharpness of reproduced images can be emphasized depending on the characteristics of the original from which the image signal is produced or on the preference of the operator.

Although certain preferred embodiments have been shown and described, it should be understood that many changes and modifications may be made therein without departing from the scope of the appended claims.

What is claimed is:

1. A method of processing an image signal by generating a new image signal (S'ij) from an image signal (Sij) in an image signal processor having a comparing means for determining the configuration of the image signal (Sij), an image emphasis signal generator and a new signal selector, said method comprising the steps of:

determining whether the configuration of the distribution of the image signal (Sij) at a point of interest (i, j) is upwardly convex, or a downwardly convex, or otherwise;

employing, as the new image signal (S'ij), an image emphasis signal ($S_G$ij) larger than the image signal (Sij) at the point of interest (i, j), if the configuration is upwardly convex; and employing, as the new image signal (S'ij), an image emphasis signal ($S_L$ij) smaller than the image signal (Sij) at the point of interest (i, j), if the configuration is downwardly convex.

2. A method according to claim 1, wherein said image emphasis signals ($S_Gij$), ($S_Lij$) are maximum and minimum signals ($Smaxij$), ($Sminij$) out of image signals in a region near the point of interest (i, j) of the image signal ($Sij$).

3. A method according to claim 1, wherein said image emphasis signals ($S_Gij$), ($S_Lij$) are produced from maximum and minimum signals (($Smaxij$), ($Sminij$) out of image signals in a region near the point of interest (i, j) of the image signal ($Sij$) and constants, t, t' ($0 < t < 1$, $0 < t' < 1$) according to the equations:

$$S_Gij = (1-t) \cdot Sij + t \cdot Smaxij$$

$$S_Lij = (1-t') \cdot Sij + t' \cdot Sminij$$

4. A method according to claim 1, 2, or 3, further comprising the steps of:
generating an unsharp signal ($Uij$); and
comparing a differential signal ($Sij - Uij$) produced by subtracting the unsharp signal ($Uij$) from the image signal ($Sij$) with a threshold signal (T) to determine whether the configuration of the distribution of the image signal ($Sij$) is upwardly convex, or a downwardly convex, or otherwise.

5. A method according to claim 4, further comprising the step of employing, as the new image signal ($S'ij$), said unsharp signal ($Uij$) if the configuration is otherwise.

6. A method according to claim 4, wherein said unsharp signal ($Uij$) comprises an average signal ($Uaveij$) or a median signal ($Umedij$) in a region near the point of interest (i, j).

7. A method according to claim 4, further comprising the step of generating a sharpness emphasized signal ($S^*ij$) from the new image signal ($S'ij$) and the unsharp signal ($Uij$) according to the equation:

$$S^*ij = S'ij + K \cdot (S'ij - Uij)$$

where K is a coefficient signal.

8. A method according to claim 7, wherein said coefficient signal K and the differential signal ($S'ij - Uij$) are replaced respectively with a function signal ($KS'ij$)) with the image signal ($S'ij$) as a variable and a function signal ($F(S'ij - Uij)$) with the differential signal ($S'ij - Uij$) as a variable, and the sharpness emphasized signal ($S^*ij$) is generated according to the equation:

$$S^*ij = S'ij + K(S'ij) \cdot F(S'ij - Uij).$$

9. A method according to claim 4, further comprising the step of generating a sharpness emphasized signal ($S^*ij$) from the original image signal ($Sij$), the new image signal ($S'ij$), and the unsharp signal ($Uij$) according to the equation:

$$S^*ij = Sij + K \cdot (S'ij - Uij)$$

where K is a coefficient signal.

10. A method according to claim 9, wherein said coefficient signal K and the differential signal ($S'ij - Uij$) are replaced respectively with a function signal ($K(Sij)$) with the original image signal ($Sij$) as a variable and a function signal ($F(S'ij - Uij)$) with the differential signal ($S'ij - Uij$) as a variable, and the sharpness emphasized signal ($S'ij$) is generated according to the equation:

$$S^*ij = Sij + K(Sij) \cdot F(S'ij - Uij).$$

11. A method according to claim 4, further comprising the steps of generating an unsharp signal ($U'ij$) from the new image signal ($S'ij$), and thereafter generating a sharpness emphasized signal ($S^*ij$) from the new image signal ($S'ij$) and the unsharp signal ($U'ij$) according to the equation:

$$S^*ij = S'ij + K \cdot (S'ij - U'ij)$$

where K is a coefficient signal.

12. A method according to claim 11, wherein said coefficient signal K and the differential signal ($S'ij - U'ij$) are replaced respectively with a function signal ($K(S'ij)$) with the image signal ($S'ij$) as a variable and a function signal ($F(S'ij - U'ij)$) with the differential signal ($S'ij - U'ij$) as a variable, and the sharpness emphasized signal ($S^*ij$) is generated according to the equation:

$$S^*ij = S'ij + K(S'ij) \cdot F(S'ij - U'ij).$$

13. A method according to claim 1, 2, or 3, further comprising the step of comparing a Laplacian signal ($\nabla^2 Sij$) produced from the image signal ($Sij$) with a threshold signal (T) to determine whether the configuration of the distribution of the image signal ($Sij$) is upwardly convex, or a downwardly convex, or otherwise.

14. A method according to claim 13, further comprising the steps of:
generating an unsharp signal ($Uij$); and
employing, as the new image signal ($S'ij$), said unsharp signal ($Uij$) if the configuration is otherwise.

15. A method according to claim 1, further comprising the step of generating a sharpness emphasized signal ($S^*ij$) from the original image signal ($Sij$), the new image signal ($S'ij$), and an unsharp signal ($U'ij$) produced from the new image signal ($S'ij$), according to the equation:

$$S^*ij = S'ij + K \cdot (S'ij)(S'ij - Uij)$$

where K is a coefficient signal.

16. A method according to claim 15, wherein said coefficient signal K and the differential signal ($S'ij - U'ij$) are replaced respectively with a function signal ($K(Sij)$ with the original image signal ($Sij$) as a variable and a function signal ($F(S'ij - U'ij)$) with the differential signal ($S'ij - U'ij$) as a variable, and the sharpness emphasized signal ($S^*ij$) is generated according to the equation:

$$S^*ij = S'ij + K(S'ij) \cdot F(S'ij - Uij).$$

17. An apparatus for processing an image signal, comprising:
comparing means (52) for determining whether the configuration of the distribution of the image signal ($Sij$) at a point of interest (i, j) is upwardly convex, or a downwardly convex, or otherwise;
image emphasis signal generating means (62) for generating an image emphasis signal ($S_Gij$) larger than the image signal ($Sij$) at the point of interest (i, j) or an image emphasis signal ($S_Lij$) smaller than the image signal ($Sij$) at the point of interest (i, j); and
new signal selecting means (46) for selecting said image emphasis signal ($S_Gij$) if the configuration is upwardly convex, the image emphasis signal (S$_L$ij) if the configuration is downwardly convex, and the image signal (Sij) if the configuration is otherwise.

18. An apparatus according to claim 17, wherein said image emphasis signals (S$_G$ij), (S$_L$ij) are maximum and minimum signals (Smaxij), (Sminij) out of image signals in a region near the point of interest (i, j) of the image signal (Sij).

19. An apparatus according to claim 17, wherein said image emphasis signals ((S$_G$ij), (S$_L$ij) are produced from maximum and minimum signals (Smaxij), (Sminij) out of image signals in a region near the point of interest (i, j) of the image signal (Sij) and constants t, t' (0<t<1, 0<t'<1) according to the equations:

$$S_Gij = (1-t)\cdot Sij + t\cdot Smaxij$$

$$S_Lij = (1-t')\cdot Sij + t'\cdot Sminij.$$

20. An apparatus according to claim 17, 18 or 19, further comprising secondary differentiating means (60) for generating a Laplacian signal ($\nabla^2$Sij) from the image signal (Sij), said comparing means (52) comprising means for comparing the Laplacian signal ($\nabla^2$Sij) with a threshold signal (T) to determine whether the configuration of the distribution of the image signal (Sij) is upwardly convex, or a downwardly convex, or otherwise.

21. An apparatus according to claim 20, further comprising unsharp signal generating means (80) for generating an unsharp signal (U'ij) from the new image signal (S'ij), and subtracting means (54), multiplying means (58), and adding means (56) for generating a sharpness emphasized signal (S*ij) from the new image signal (S'ij) and the unsharp signal (U'ij) according to the equation:

$$S^*ij = S'ij + K\cdot(S'ij - U'ij)$$

where K is a coefficient signal.

22. An apparatus according to claim 21, wherein said coefficient signal K and the differential signal (S'ij−U'ij) are replaced respectively with a function signal (K(S'ij)) with the image signal (S'ij) as a variable and a function signal (F(S'ij−U'ij)) with the differential signal (S'ij−U'ij) as a variable, and the sharpness emphasized signal (S*ij) is generated according to the equation:

$$S^*ij = S'ij + K(S'ij)\cdot F(S'ij - U'ij).$$

23. An apparatus according to claim 20, wherein a sharpness emphasized signal (S*ij) is generated from the original image signal (Sij), the new image signal (S'ij), and an unsharp signal (U'ij) produced from the new image signal (S'ij), according to the equation:

$$S^*ij = S'ij + K\cdot(S'ij - U'ij)$$

where K is a coefficient signal.

24. An apparatus according to claim 23, wherein said coefficient signal K and the differential signal (S'ij−U'ij) are replaced respectively with a function signal (K(Sij)) with the original image signal (Sij) as a variable and a function signal (F(S'ij−U'ij)) with the differential signal (S'ij−U'ij) as a variable, and the sharpness emphasized signal (S*ij) is generated according to the equation:

$$S^*ij = S'ij + K(S'ij)\cdot F(S'ij - U'ij).$$

25. An apparatus for processing an image signal, comprising:
  comparing means (52) for determining whether the configuration of the distribution of the image signal (Sij) at a point of interest (i, j) is upwardly convex, or a downwardly convex, or otherwise;
  image emphasis signal generating means (62) for generating an image emphasis signal (S$_G$ij) larger than the image signal (Sij) at the point of interest (i, j) or an image emphasis signal (S$_L$ij) smaller than the image signal (Sij) at the point of interest (i, j);
  unsharp signal generating means (40) for generating an unsharp signal (Uij) from the image signal (Sij); and
  new signal selecting means (46) for selecting said image emphasis signal (S$_G$ij) if the configuration is upwardly convex, the image emphasis signal (S$_L$ij) if the configuration is downwardly convex, and one of the image signal (Sij) and the unsharp signal (Uij) if the configuration is otherwise.

26. An apparatus according to claim 25, wherein said image emphasis signals (S$_G$ij), (S$_L$ij) are maximum and minimum signals (Smaxij), (Sminij) out of image signals in a region near the point of interest (i, j) of the image signal (Sij).

27. An apparatus according to claim 25, wherein said image emphasis signals (S$_G$ij), (S$_L$ij) are produced from maximum and minimum signals (Smaxij), (Sminij) out of image signals in a region near the point of interest (i, j) of the image signal (Sij) and constants t, t' (0<t<1, 0<t'<1) according to the equations:

$$S_Gij = (1-t)\cdot Sij + t\cdot Smaxij$$

$$S_Lij = (1-t')\cdot Sij + t'\cdot Sminij.$$

28. An apparatus according to claim 25, 26, or 27, further comprising subtracting means (42) for subtracting the unsharp signal (Uij) from the image signal (Sij) to produce a differential signal (Sij−Uij), said comparing means (52) comprising means for comparing the differential signal (Sij−Uij) with a threshold signal (T) to determine whether the configuration of the distribution of the image signal (Sij) is upwardly convex, or a downwardly convex, or otherwise.

29. An apparatus according to claim 28, wherein said unsharp signal generating means (40) comprising means for generating an average signal (Uaveij) or a median signal (Umedij) in a region near the point of interest (i, j).

30. An apparatus according to claim 29, further comprising unsharp signal generating means (80) for generating an unsharp signal (U'ij) from the new image signal (S'ij), and subtracting means (54), multiplying means (58), and adding means (56) for generating a sharpness emphasized signal (S*ij) from the new image signal (S'ij) and the unsharp signal (U'ij) according to the equation:

$$S^*ij = S'ij + K\cdot(S'ij - U'ij)$$

where K is a coefficient signal.

31. An apparatus according to claim 30, wherein said coefficient signal K and the differential signal (S'ij−U'ij) are replaced respectively with a function signal (K(S'ij)) with the image signal (S'ij) as a variable and a function signal (F(S'ij−U'ij)) with the differential signal (S'ij−U'ij) as a variable, and the sharpness emphasized signal (S*ij) is generated according to the equation:

$$S^*ij = S'ij + K(S'ij) \cdot F(S'ij - U'ij).$$

32. An apparatus according to claim 29, wherein a sharpness emphasized signal (S*ij) is generated from the original image signal (Sij), the new image signal (S'ij), and an unsharp signal (U'ij) produced from the new image signal (S'ij), according to the equation:

$$S^*ij = S'ij + K \cdot (S'ij - U'ij)$$

where K is a coefficient signal.

33. An apparatus according to claim 32, wherein said coefficient signal K and the differential signal (S'ij−U'ij) are replaced respectively with a function signal (K(Sij)) with the original image signal (Sij) as a variable and a function signal (F(S'ij−U'ij)) with the differential signal (S'ij−U'ij) as a variable, and the sharpness emphasized signal (S*ij) is generated according to the equation:

$$S^*ij = S'ij + K(S'ij) \cdot F(S'ij - U'ij).$$

34. An apparatus according to claim 28, further comprising subtracting means (54), multiplying means (58), and adding means (56), for generating a sharpness emphasized signal (S*ij) from the new image signal (S'ij) and the unsharp signal (Uij) according to the equation:

$$S^*ij = S'ij + K \cdot (S'ij - Uij)$$

where K is a coefficient signal.

35. An apparatus according to claim 34, wherein said coefficient signal K and the differential signal (S'ij−Uij) are replaced respectively with a function signal (K(S'ij)) with the image signal (S'ij) as a variable and a function signal (F(S'ij−Uij)) with the differential signal (S'ij −Uij) as a variable, and the sharpness emphasized signal (S*ij) is generated according to the equation:

$$S^*ij = S'ij + K(S'ij) \cdot F(S'ij - Uij).$$

36. An apparatus according to claim 25, 26 or 27, further comprising secondary differentiating means (60) for generating a Laplacian signal ($\nabla^2 Sij$) from the image signal (Sij), said comparing means (52) comprising means for comparing the Laplacian signal ($\nabla^2 Sij$) with a threshold signal (T) to determine whether the configuration of the distribution of the image signal (Sij) is upwardly convex, or a downwardly convex, or otherwise.

37. An apparatus according to claim 25, 26 or 27, wherein a sharpness emphasized signal (S*ij) is generated from the original image signal (Sij), the new image signal (S'ij), and the unsharp signal (Uij) according to the equation:

$$S^*ij = S'ij + K \cdot (S'ij - Uij).$$

where K is a coefficient signal.

38. An apparatus according to claim 37, wherein said coefficient signal K and the differential signal (S'ij−Uij) are replaced respectively with a function signal (K(Sij)) with the original image signal (Sij) as a variable and a function signal (F(S'ij−Uij)) with the differential signal (S'ij−Uij) as a variable, and the sharpness emphasized signal (S*ij) is generated according to the equation:

$$S^*ij = S'ij + K(S'ij) \cdot F(S'ij - Uij).$$

* * * * *

UNITED STATES PATENT AND TRADEMARK OFFICE
CERTIFICATE OF CORRECTION

PATENT NO. : 5,087,972
DATED : February 11, 1992
INVENTOR(S) : Katsuto Sumi

It is certified that error appears in the above-indentified patent and that said Letters Patent is hereby corrected as shown below:

On the Title page, item [56], References Cited, delete "4,081,836 8/1978 Skihner" and insert --4,081,836  3/1978 Skinner--.

Signed and Sealed this

Seventeenth Day of August, 1993

Attest:

BRUCE LEHMAN

Attesting Officer

Commissioner of Patents and Trademarks